US007516534B2

(12) United States Patent
Easterbrook et al.

(10) Patent No.: US 7,516,534 B2
(45) Date of Patent: Apr. 14, 2009

(54) METHOD FOR ATTACHING A NUT ELEMENT TO A METAL STRUCTURE

(75) Inventors: Eric T. Easterbrook, Kent, WA (US); Milton Sigelmann, Lake Forest Park, WA (US); Michael Landy, Bellevue, WA (US); Taeksun Nam, Kirkland, WA (US)

(73) Assignee: Stresswave, Inc., Kent, WA (US)

( * ) Notice: Subject to any disclaimer, the term of this patent is extended or adjusted under 35 U.S.C. 154(b) by 703 days.

(21) Appl. No.: 10/305,469

(22) Filed: Nov. 25, 2002

(65) Prior Publication Data

US 2003/0118419 A1 Jun. 26, 2003

Related U.S. Application Data

(60) Provisional application No. 60/333,402, filed on Nov. 25, 2001.

(51) Int. Cl.
*B23P 11/00* (2006.01)
*B23P 17/00* (2006.01)
*F16B 37/00* (2006.01)
*F16B 37/04* (2006.01)

(52) U.S. Cl. ........................ 29/509; 29/523; 29/525.01; 29/525.05; 403/282; 411/180; 411/500

(58) Field of Classification Search ............. 29/402.01, 29/402.09, 402.11, 402.19, 509, 525, 522.1, 29/525.01, 525.05, 505, 523; 411/500, 501, 411/504, 179, 181, 180; 403/274, 278, 282, 403/285

See application file for complete search history.

(56) References Cited

U.S. PATENT DOCUMENTS 1,190,803 A * 7/1916 Rosenfeld .................. 29/522.1
2,372,485 A * 3/1945 Griffin ........................ 403/282
3,081,808 A * 3/1963 Rosan et al. ................ 411/178
3,093,887 A * 6/1963 Harry et al. .................... 29/845
3,137,186 A * 6/1964 Rosan et al. ............. 29/240.05
3,618,851 A 11/1971 Webster et al.
3,953,906 A 5/1976 Brown
4,051,592 A 10/1977 Briles
4,186,787 A 2/1980 Husain (Continued)

FOREIGN PATENT DOCUMENTS

EP 468598 B1 11/1994

(Continued)

OTHER PUBLICATIONS

EP 03 81 1987 (Application) EPO Search Report dated Jan. 30, 2006.

*Primary Examiner*—Jermie E Cozart
(74) *Attorney, Agent, or Firm*—R. Reams Goodloe, Jr.

(57) ABSTRACT

A method of installing fastening elements, and rivetless fasteners for use with the method. Rivetless nutplate fasteners are installed in metal structures by providing flush fit barrel shaped plug or bushing portions in a hole in the structure as defined by an edge wall. The barrel portion is acted upon axially, and expanded radially outward toward the edge wall of the hole, to provide an interference fit. The ends of the barrel portion are machined as desired for flushness. Also, a hole is installed as necessary. Rivetless nutplates are easily installed, and the installation enhances fatigue life of the hole surrounding the barrel of the nutplate.

59 Claims, 22 Drawing Sheets

840 841 836 838 832 830 834 837 843 843 830 843 93 91 91 93 200 202

U.S. PATENT DOCUMENTS

| | | | | |
|---|---|---|---|---|
| 4,331,026 | A | 5/1982 | Howard et al. | |
| 4,402,124 | A * | 9/1983 | Krueger | 29/520 |
| 4,475,859 | A | 10/1984 | Oliver | |
| 4,557,650 | A | 12/1985 | Molina | |
| 4,817,264 | A | 4/1989 | Worthing | |
| 4,850,771 | A | 7/1989 | Hurd | |
| 4,858,289 | A * | 8/1989 | Speller, Sr. | 29/34 B |
| 4,934,170 | A | 6/1990 | Easterbrook et al. | |
| 4,985,979 | A | 1/1991 | Speakman | |
| 5,066,180 | A | 11/1991 | Lang et al. | |
| 5,096,349 | A | 3/1992 | Landy et al. | |
| 5,103,548 | A | 4/1992 | Reid et al. | |
| 5,131,145 | A | 7/1992 | Badoureaux | |
| 5,146,668 | A | 9/1992 | Gulistan | |
| 5,219,255 | A | 6/1993 | Hussain et al. | |
| 5,245,743 | A | 9/1993 | Landy et al. | |
| 5,335,411 | A * | 8/1994 | Muller et al. | 29/512 |
| 5,380,136 | A | 1/1995 | Copple et al. | |
| 5,405,228 | A | 4/1995 | Reid et al. | |
| 5,445,483 | A * | 8/1995 | Fultz | 411/181 |
| 5,468,104 | A | 11/1995 | Reid et al. | |
| 5,613,815 | A * | 3/1997 | Muller | 411/181 |
| 5,715,652 | A | 2/1998 | Stahlecker | |
| 6,077,010 | A | 6/2000 | Reid et al. | |
| 6,183,190 | B1 | 2/2001 | Raiteri | |
| 6,244,807 | B1 | 6/2001 | Garcia | |
| 6,272,728 | B1 | 8/2001 | Lenac et al. | |
| 6,293,496 | B1 | 9/2001 | Moe | |
| 6,370,752 | B1 | 4/2002 | Anderson et al. | |
| 6,470,756 | B1 | 10/2002 | Prime | |
| 6,502,295 | B1 | 1/2003 | Morgand | |

FOREIGN PATENT DOCUMENTS

| | | | |
|---|---|---|---|
| EP | 513898 | B1 | 3/1995 |
| EP | 1147849 | A1 | 10/2001 |

* cited by examiner

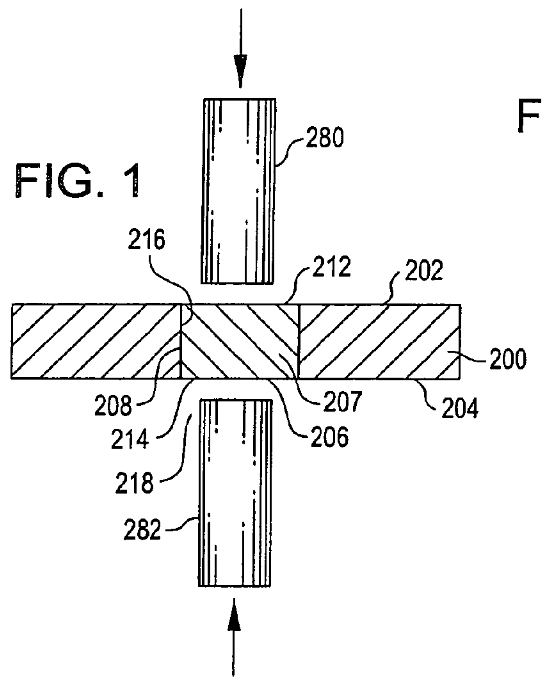
FIG. 1
280
216
212
202
200
208
207
214
206
204
218
282
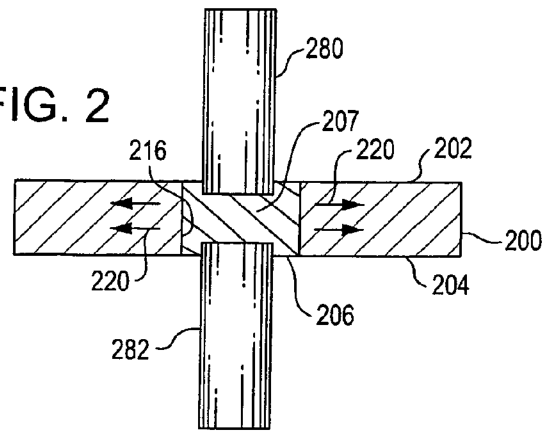
FIG. 2
280
207
216
220
202
200
220
204
206
282
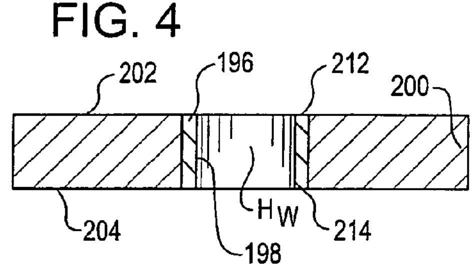
FIG. 4
202
196
212
200
204
HW
214
198
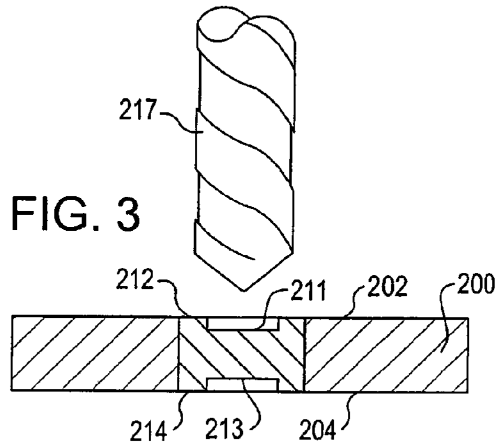
217
FIG. 3
212
211
202
200
214
213
204
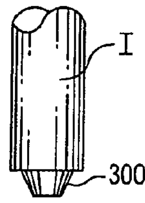
FIG.5
I
300
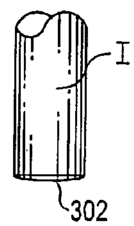
FIG. 5A
I
302
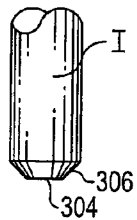
FIG. 6
I
306
304
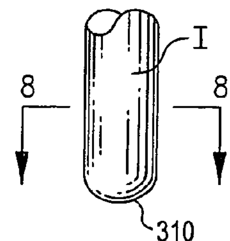
FIG. 7
I
8
8
310
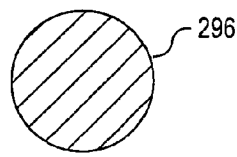
FIG. 8
296
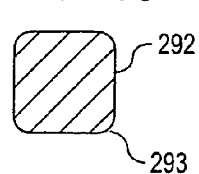
FIG. 9
290
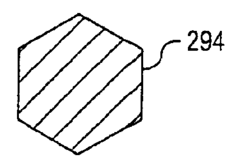
FIG. 10
292
293
FIG. 11
294

312
216
316
320
202
328
208
327
318
204
329
322
314

312
202
327
204
200
314

202
211″
200
327
213″
204

196
202
H W
200
198
204

332
340
346
336
354
349
350
338
342
348
334

332
336
354
340
352
352
352
352
350
336
340
334

346′
202
200
350
348′
354
204

196
202
H W
200
198
204

362
340
366
367
346
348
367
366
342
364

362
340
367
352
352
350
369
364

202
200
354
346'
350
348'
354

196
202
200
198
HW
204

382
386
390
396
394
202
200
398
392
388
384
204

382
398
352
352
202
200
354
204
384

196
202
200
198
HW
204

202
354
400
398
200
402
204

410
414
202
200
204
420
416
412

410
414
202
352
200
204
354
416
410
352

202
422

200
204
420
424

410
414
440
417
202
200
204
418
416
412

196
202
200
198
HW
204

440
202
352
352
204
200

586
200
202
354
454
HW
452
204

442
440
200
202
354
444
204
217

504
508
512
502
202
500
204
514
510
200
506

504
502
352
352
354
354
506

526
502
202
522
520
524
$H_W$
204
200

516
502
202
500
518
204
200

534
504
530
508
536
536
538
538
202
502
502
204
510
200
500
506

530
534
504
536
536
538
202
502
502
200
204
500
352
510
506

534
530
536
538
202
502
204
500
200
217

540
538
200
502
202
$H_W$
204
500

504

538
200
502
202
204
550
506

504
538
200

502
202
204
550
506

552
538
200
502
202
550
554
204
217

540
538
200
502
202
$H_W$
204
550

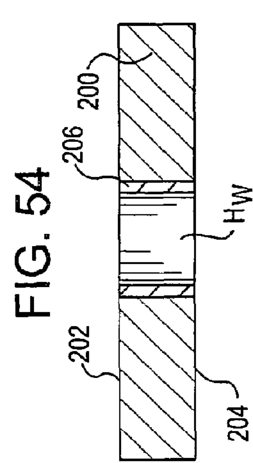
FIG. 54
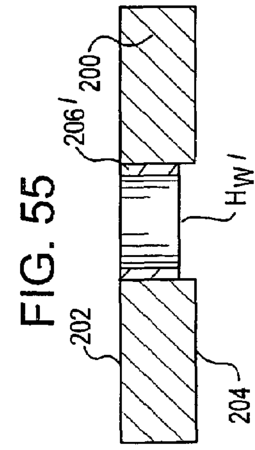
FIG. 55
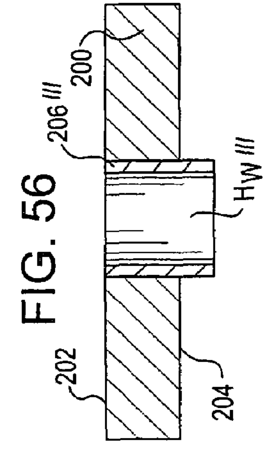
FIG. 56
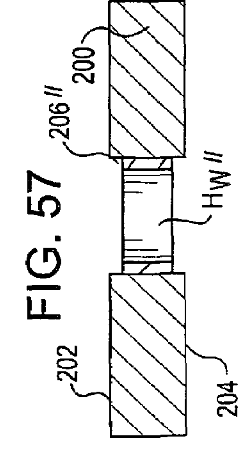
FIG. 57
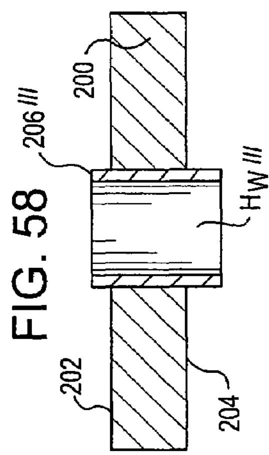
FIG. 58
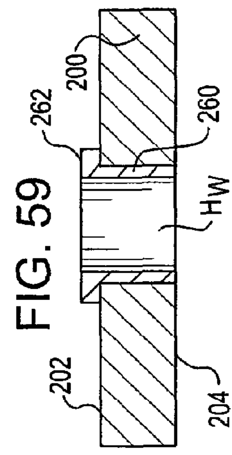
FIG. 59
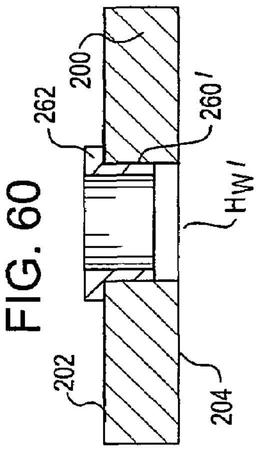
FIG. 60
FIG. 61
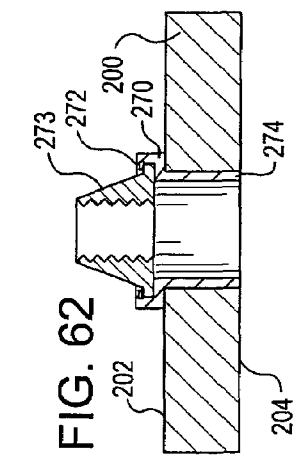
FIG. 62
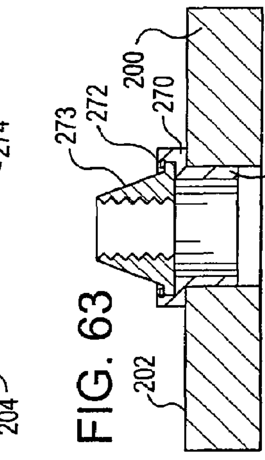
FIG. 63
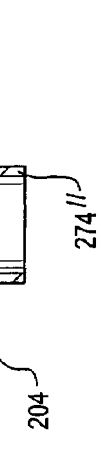
FIG. 64

273
272
202
200
270
204
274''
251

273
272
202
200
270
274
204

504

538
298
502
200'
550
560
506

538
552
298
502
200'
554
560
217

538
298
502
200'
562
560
251

538
298
502
200'
560
564
HW
550''

538
502
584
580
582
200″
251

538
502
200″
584
Hw
582′

T
586
202
354
Hw
452
204
200

196
T
212
202
Hw
214
204
200

504
508
594
202
592
200
204
590
510
596
506

251
600
354
352
202
352
200
602
590

594′
354
354
202
200 2
200
200 1
590
204

R1
490
468
246
244
202
250
245
240
464
248
468
492

490
464
468
246
250
202
468
492
466

251
610
246
202
200
245
612
204

246'
250
244
202
200
245
612
204

700
704
702
706

724
720
726
726
728
725
750
700
202
742
740
200
204
735
728
730
736
736
734

752
704
706
754
217

724
726
202
200
352
735
352
738
736
204
734

724
720
726
726
728
725
202
700
200
204
728
735
736
736
730
734

700'
762
704
202
706
204
200
760
$H_W$ 840
841

836
838
832
830
834
837
843
843
830'
843
93
91
91
93
200
202

840
838
832
202

836
838
840
832
202
830'

840
841
841
836
T
837
202
200
834
830'

217
816
818
843
843
202
200

843
202
200
204
I2
I1
834
830
843

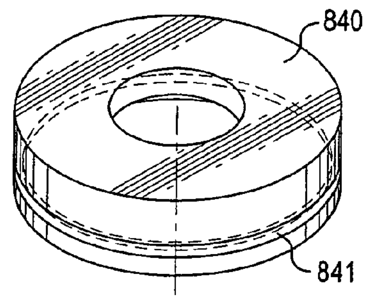
FIG. 94
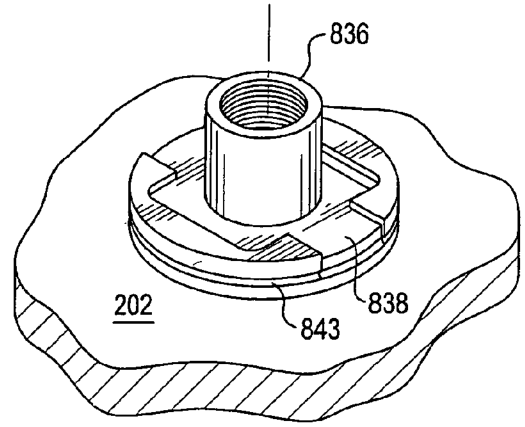
FIG. 95
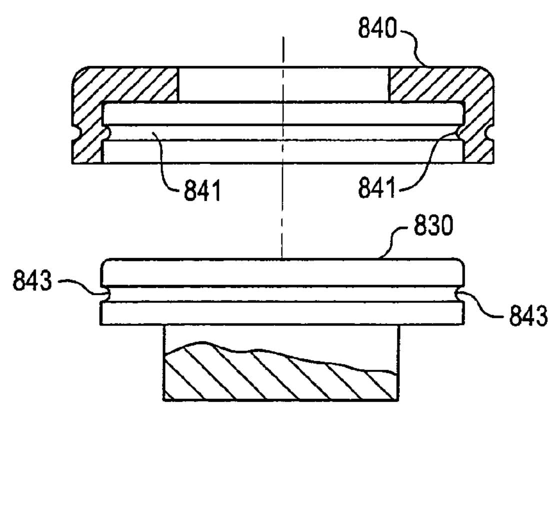
FIG. 96
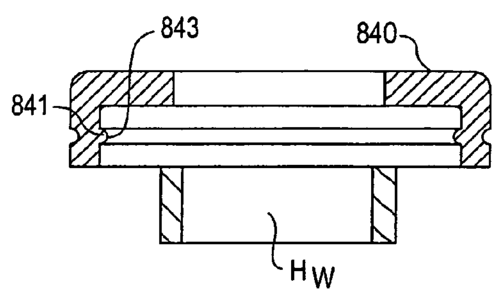
FIG. 97
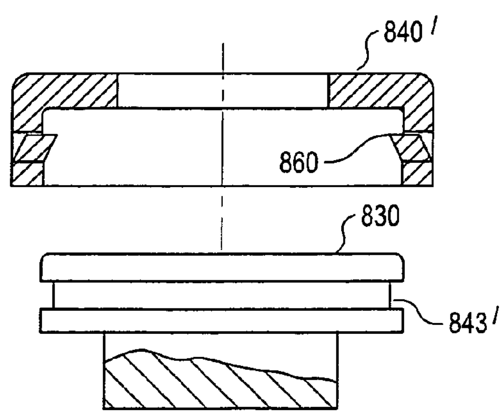
FIG. 98
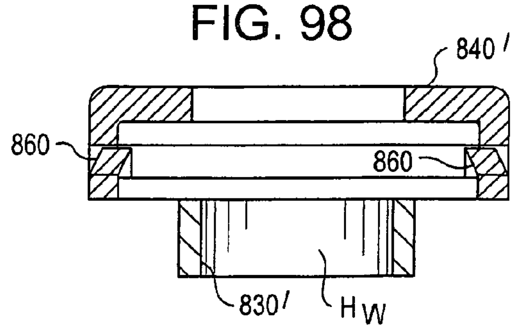

900
836
T
834
903
202
902
200
830'

920
836
830
202
838

920
836
838
830
202
200
830

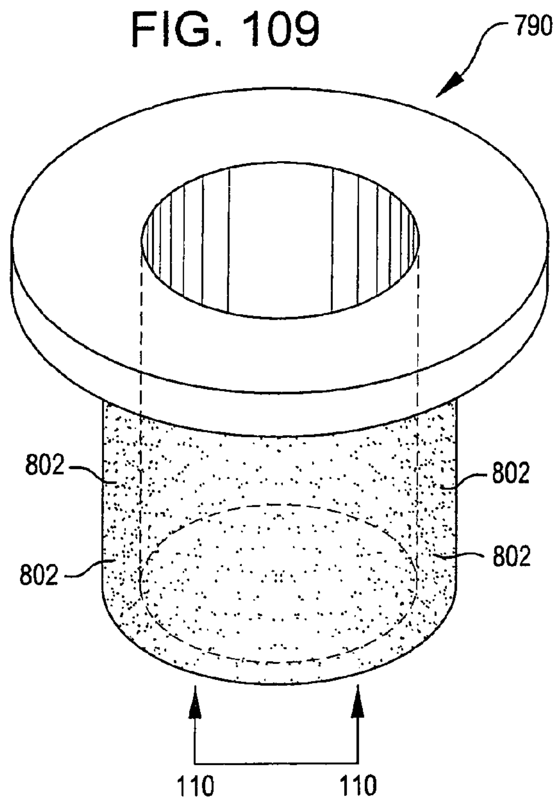
FIG. 109
790
802
802
802
802
110
110
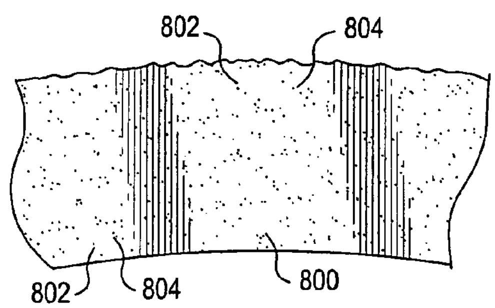
FIG. 110
802
804
802
804
800
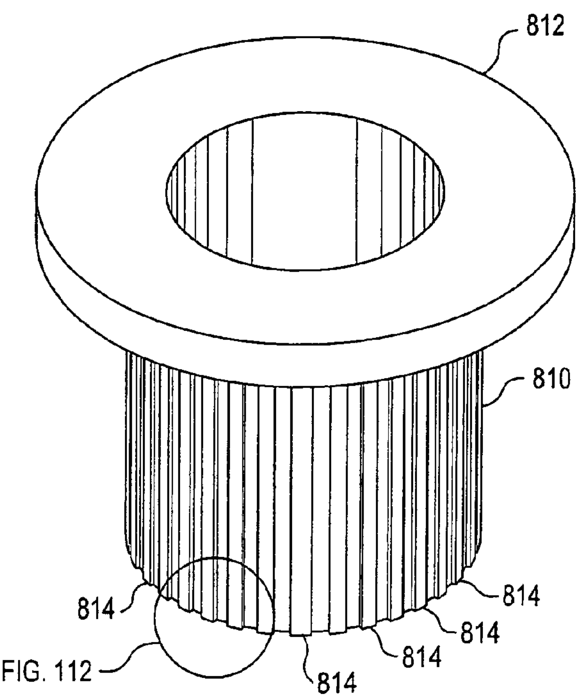
FIG. 111
812
810
814
814
814
814
814
FIG. 112
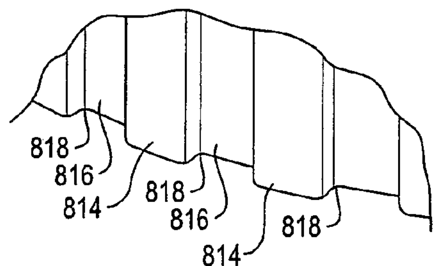
FIG. 112
818
816
814
818
816
814
818

HOOP STRESS
FRINGE LEVELS
MPa
ksi
1.500e+002
2.000e+004
8.500e+001
1.100e+004
2.000e+001
2.000e+003
-4.500e+001
-7.000e+003
-1.100e+002
-1.600e+004
-1.750e+002
-2.500e+004
-2.400e+002
-3.400e+004
-3.050e+002
-4.300e+004
-3.700e+002
-5.200e+004
-4.350e+002
-6.100e+004
-5.000e+002
-7.000e+004
Y
X HOOP STRESS
FRINGE LEVELS
MPa
ksi
1.500e+002
2.000e+004
8.500e+001
1.100e+004
2.000e+001
2.000e+003
-4.500e+001
-7.000e+003
-1.100e+002
-1.600e+004
-1.750e+002
-2.500e+004
-2.400e+002
-3.400e+004
-3.050e+002
-4.300e+004
-3.700e+002
-5.200e+004
-4.350e+002
-6.100e+004
-5.000e+002
-7.000e+004
Y
X HOOP STRESS
FRINGE LEVELS
MPa
ksi
1.500e+002
2.000e+004_
8.500e+001
1.100e+004_
2.000e+001
2.000e+003_
-4.500e+001
-7.000e+003_
-1.100e+002
-1.600e+004_
-1.750e+002
-2.500e+004_
-2.400e+002
-3.400e+004_
-3.050e+002
-4.300e+004_
-3.700e+002
-5.200e+004_
-4.350e+002
-6.100e+004_
-5.000e+002
-7.000e+004_
Y
X HOOP STRESS
FRINGE LEVELS
MPa
ksi
1.500e+002
2.000e+004_
8.500e+001
1.100e+004_
2.000e+001
2.000e+003_
-4.500e+001
-7.000e+003_
-1.100e+002
-1.600e+004_
-1.750e+002
-2.500e+004_
-2.400e+002
-3.400e+004_
-3.050e+002
-4.300e+004_
-3.700e+002
-5.200e+004_
-4.350e+002
-6.100e+004_
-5.000e+002
-7.000e+004_
Y
X HOOP STRESS
FRINGE LEVELS
MPa
ksi
1.500e+002
2.000e+004
8.500e+001
1.100e+004
2.000e+001
2.000e+003
-4.500e+001
-7.000e+003
-1.100e+002
-1.600e+004
-1.750e+002
-2.500e+004
-2.400e+002
-3.400e+004
-3.050e+002
-4.300e+004
-3.700e+002
-5.200e+004
-4.350e+002
-6.100e+004
-5.000e+002
-7.000e+004
Y
X

METHOD FOR ATTACHING A NUT ELEMENT TO A METAL STRUCTURE

RELATED PATENT APPLICATIONS

This invention is related to U.S. Provisional Patent Application Ser. No. 60/333,402, filed on Nov. 25, 2001, entitled Method and Apparatus for Securing a Blind Nut Attachment, the disclosure of which is incorporated herein in its entirety, including the specification, drawing, and claims, by this reference

COPYRIGHT RIGHTS IN THE DRAWING

A portion of the disclosure of this patent document contains material that is subject to copyright protection. The applicant no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to methods for installing inserts used as fastening elements into apertures in metal structure walls. More specifically, it relates to methods for installing inserts such as plugs, bushings, and rivetless nut plates into apertures, as well as to the nut plate structures so installed.

BACKGROUND

Transportation equipment, and particularly aircraft, utilize a variety of devices and fastening methods in the assembly of structures. Many attachments that must be provided involve the use of inserts such as bushings, nut plates, or plugs. Such inserts are installed into holes, particularly into holes in walls of metal structures. Generally, bushings are applied to pinned joints requiring easy, reliable assembly. Bushings can also be provided in a suitable material selected to provide a hard wear surface; such wear surfaces can be replaceable. Rivetless nut plates are applied to locations where access by a mechanic to one side of the structure is limited or impractical due to the design of the structure. Plugs and repair bushings are applied to discrepant and misplaced holes which occur during manufacturing, as well as to those which have become non-conforming during use. Each of these items presently utilizes a bushing or bushing-like member that is presently installed using any one of a variety of heretofore available methods.

Bushings. One of the simplest methods previously utilized for joining two members together is the use of a single bolt or pin connection. Such a joint can carry relatively large loads yet is easily and quickly connected. It has been generally standard practice to use bushings in the holes of the single bolt or pin type connections to protect against wear at the pin-to-hole interface. However, high cyclic stress and relative rotational motion work to cause fatigue and fretting damage to such joints. Use of a bushing allows a damaged structure to be repaired by simply installing a new bushing into the fitting. Bushings also provide for an increase in bearing strength of a bolt or pin connection by slightly increasing the bearing diameter.

Even with such benefits, structural assemblies with bushed holes have been historically prone to fatigue damage due to high loading and relative oscillatory motion at the bushing-to-structure interface. Additionally, such interfaces as heretofore often found are subject to damage from corrosive elements found in the environment.

A common method for improving the fatigue life of a bushed hole is to install an interference fit bushing. Bushing interference is defined as the geometric difference between the outside diameter of the bushing and the diameter of the hole in which it is installed. Traditional techniques use a liquid nitrogen bath to shrink oversize bushings into holes. Upon warming, the installed bushing expands in an attempt to return to its original diameter, although it is compressively restrained from complete expansion by the edge wall of the hole in which it has been inserted. This action results in an interference fit with the hole. The shrink-fit technique, as it is generally known, is typically limited to a diametric interference of about 0.002 to 0.003 inches, more or less. Attempts to install bushings at higher interference fit levels have often resulted in scoring and galling of the edge wall of the hole, undesirably resulting in reduced fatigue life.

However, one prior art method developed by The Boeing Company (formerly at McDonnell Aircraft Company, St. Louis, Mo., US) installs bushings to a much greater degree of interference than just mentioned, by using a method of hole cold expansion tooling. Initial clearance fit bushings are expanded into holes using a tapered mandrel. That method provides higher interference fit levels (0.004 to 0.008 inches), and results in some improvement in fatigue life.

Nut Plates. A nut plate is a device that can be generally described as a small plate to which a fastener nut is secured, which in turn is secured to a wall of a structure, to facilitate blind attachment of panels or other objects. A blind attachment is conventionally described as one where access to the backside of the wall is not physically accessible, as is the case with removable access panels. Also, nut plates are generally used on thin walls that are insufficiently thick to permit the use of a threaded wall in an aperture. Riveted type nut plates typically include a pair of small fastener apertures spaced diametrically apart on opposite sides of a nut, and a larger, centrally located aperture coinciding with nut placement.

A primary focus of attention for improving nut plate fatigue life performance has been the elimination of the attaching rivet holes. Such a technique generally has a two-fold benefit; first by improving fatigue life by reducing the stress concentration at the rivet locations, and second by simplifying the installation procedure. Designs for the same have been generally called "rivetless" nut plates. Various rivetless nut plate designs have been produced including (1) those with swaged bushing elements with nut attach features, (2) those with epoxy bonded nut plates, and (3) those with conventional looking nut plates that are swaged and that use an anti-rotation pin.

Regardless of the design, i.e., whether riveted or rivetless, nut plates must be constructed and installed so as to reliably resist both the push-out and the rotational forces which are experienced during frequent bolt insertions and removals. A nut plate that fails to resist either of these forces, especially rotation, makes removal of a panel problematic. The resistance to push-out and to rotational forces is generally proportional to the diameter of the nut. An industry standard that has been commonly accepted for the push-out and removal resistance of a nut plate is National Aerospace Standard NASM25027. As an example, a ¼ inch nut plate must be able to withstand (1) a push-out force of 125 pounds force, and (2) a torque force of 100 inch-pounds force.

An early rivetless nut plate concept with enhanced fatigue life performance was developed by the Deutsch Fastener Corporation; the design of which is illustrated in U.S. Pat. No. 4,732,518, issued to R. Toosky on Mar. 22, 1988, and entitled FATIGUE RESISTANT FLARED FASTENER. The main feature of that nut plate is that it has a bushing-like element with integral exterior splines that serve as anti-rotation lobes. The bushing-like element inserts into a controlled starting hole dimension. The starting hole has a diametric tolerance range of 0.005 inches. The starting hole may be optionally counterbored or countersunk on the side opposite the nut, for improved flushness and for resistance to push-out. A sheet metal cage element holds the nut in a floating arrangement; that element is attached to the bushing element. That prior art nut plate is installed by first placing it into a properly sized starting hole then pressing a swaging tool consisting of locally enlarged mandrel and nosepiece. The mandrel portion of the swaging tool expands the bushing element into the hole wall while the swaging nosepiece forces the panel side portion of the bushing element into the wall—typically the counterbored or countersink area of the starting hole. The finished structure made thereby is resistant push-out and rotation forces.

Another version of a rivetless nut plate with a bushing-like element was developed by Fatigue Technology ("FTI"), and is disclosed in U.S. Pat. No. 5,405,228, issued to L. Reid et al on Apr. 11, 1995 and entitled NUT CAGE AND MOUNT. That nut plate is installed by expanding the inside diameter of the bushing element. That is accomplished by pulling a tapered mandrel pre-fitted with a split sleeve through the inside diameter. This process is similar to split sleeve cold working of a hole. The combination of the mandrel diameter and sleeve thickness results in yield of the wall of the bushing and expands it into the hole. Resistance to push-out and rotation is enhanced by a roughened exterior surface. Rivetless nut plates of that design require starting holes with diametric hole tolerances of about 0.002 inches. However, in order to achieve a reliable resistance to push-out and rotation with the FTI nut plate it is necessary to have a consistent interference fit between the outer diameter of the bushing element and the starting hole. Such interference is defined as the geometrical difference between the installed bushing element outer diameter and the original diameter of the starting hole. The high interference of the bushing element to starting hole coupled with the roughened outer surface of the bushing element provides the necessary resistance to push-out and rotational forces of the bolt. Installed diametric interference between the outer diameter of the bushing element and the starting hole typically ranges from 0.004 inches to 0.006 inches. Of course, the resulting interference is dependent on the expansion of the bushing element during installation. Therefore, the tolerance stackup, and subsequent diametric tolerances of the tools, and of the nut plate features, is very high because of the number of parameters affecting applied expansion. There are five elements in the applied expansion: inside and outside diameters of the bushing element, diameter of the mandrel, thickness of the sleeve, diameter of the starting hole and the associated tolerances for each.

Most nut plate designs are made to accommodate a range of fastener "fits". The fit is the amount of clearance between the bolt diameter and the inside diameter of the bushing element of the nut plate. These fits range from a fairly tight "net" fit (0.000 to 0.002 inches) to a very loose fit (up to 0.030 inches). In general, a tight fastener fit is associated with structure requiring load transfer carrying capability of the panels, whereas a loose fit is associated with structure requiring a high degree of interchangeability with panels from another aircraft, vendor, manufacturing lot, or the like.

The novel, improved nut plate installation method disclosed herein uses no split sleeves and therefore has no shear discontinuity to contend with. As a result the applied expansion can be increased to levels much higher than are utilized in a split sleeve nut plate design. Even with relaxed tolerances, the novel, improved nut plate designs disclosed herein exhibits greater resistance to push-out and rotation.

Also, the improved nut plate design disclosed herein does not require as high a material strength as the split sleeve installed nut plate, in order to function properly. This is especially important because the improved nut plate design allows for the use of aluminum nut plates. Such nut plates are significantly lighter than their prior art steel and titanium counterparts and have an added bonus in that prior art materials using dissimilar metals often incurred corrosion problems in aluminum walls, which difficulties can be avoided by use of similar materials.

In view of the close tolerance requirements involved in prior art nut plate designs, and the fact that prior art fatigue life enhancing methods involve the use of complicated processes such as cold expansion or split sleeve methods, it can readily be appreciated that a simple and novel method for installing nutplates, and the unique fatigue life enhanced structures including such nutplates as disclosed hereinbelow, represent important improvements in the art.

BRIEF DESCRIPTION OF THE DRAWING

In order to enable the reader to attain a more complete appreciation of the invention, and of the novel features and the advantages thereof, attention is directed to the following detailed description when considered in connection with the accompanying figures of the drawing, wherein:

FIG. 1 illustrates an initial setup step in a method for installing an insert in a structure, using a solid plug-like starting element that is flush mounted in a metal structure.

FIG. 2 illustrates an indenting step for working on the structure just set forth in FIG. 1, utilizing opposing indenters on the obverse and reverse sides of the insert to impart physical deformation on the insert and to expand at least a portion of the insert radially outward, and to thus expand the selected hole radially outward, so that residual compressive stress is provided at the hole to enhance fatigue life of the hole in which the insert is installed.

FIG. 3 illustrates the step of machining a working hole of desired size in the insert first shown in FIGS. 1 and 2 above.

FIG. 4 shows the appearance of a final installed straight wall bushing in a metal structure, using as an insert a solid plug-like starting element, via the method just shown in FIGS. 1-3.

FIGS. 5, 5A, 6, and 7 illustrate the use of various indenter end shapes for installing plugs and bushings in a selected wall structure.

FIG. 5 shows an indenter having, at least in part, a conical shape, and more particularly as described, a flat bottom, conical sidewalls, and an annular shoulder portion which may be used as a mechanical stop or as a fatigue enhancing indenter feature.

FIG. 5A shows the use of an indenter having uniform pressure shape on the working end, wherein the shape is configured to provide a uniform pressure profile which indenting a preselected insert material at a selected pressure.

FIG. 6 shows the use of an indenter having a centrally located flat bottom portion, and having beveled sidewalls extending outward from the flat bottom portion.

FIG. 7 shows the use of an indenter having a half-spherical shaped working end.

FIG. 8 provides one cross-sectional configuration suitable for use in some indenters, namely a cylindrical cross-sectional shape.

FIG. 9 provides one cross-sectional configuration suitable for use in some indenters, namely an eccentric or elliptical cross-sectional shape, which shape is useful for application of pressure for physically deforming complementary shaped inserts, or for application of non-uniform pressure to other insert shapes.

FIG. 10 provides one cross-sectional configuration suitable for use in some indenters, namely a rectangular shape with radiused corners.

FIG. 11 provides one cross-sectional configuration suitable for use in some indenters, namely a polygonal shape, here showing a hexagonal cross-sectional shape, useful for application of non-uniform pressure in various insert shapes.

FIG. 26 illustrates an initial setup step in a method for installing an insert in a structure, using an "ring-shaped" plug-like starting element having, in cross-section, opposing inward pointing pentagonal portions that provide inwardly (radially) and inwardly (axially) sloping walls against which a complementary shaped indenter acts, and now further illustrating the use of a stop foot on each of the opposing indenters.

FIG. 27 illustrates an indenting step for working on the deformable insert and on the structure just set forth in FIG. 26, utilizing opposing indenters on the obverse and reverse sides of the insert, and particularly, on the inward (radial) and inward (axial) sloping sidewall portions of the insert ring-shaped bushing, to impart physical deformation on the insert and to expand at least a portion of the insert radially outward, and to thus expand the selected hole radially outward, so that residual compressive stress is provided at the hole to enhance fatigue life of the hole in which the insert is installed.

FIG. 28 illustrates the enlarged indentations in the ring-shaped insert, before the step of machining a working hole of desired size in the insert, in the manner first shown in FIG. 3 above.

FIG. 29 shows the appearance of a final installed straight wall bushing in a metal structure, using as an insert a ring-shaped plug-like starting insert, as prepared via the method just shown in FIGS. 26-28.

FIG. 30 illustrates an initial setup step in a method for installing an insert in a structure, using an annular, ring-shaped plug-like starting element having an interior sidewall portion, and first and second ends against which indenters act, and now further illustrating the use of a stop foot on each of the opposing indenters, where the stop foot also acts as a pilot nose for locating each indenter relative to the annular ring-shaped plug-like insert.

FIG. 31 illustrates an indenting step for working on the deformable insert and on the structure just set forth in FIG. 30, utilizing opposing indenters on the obverse and reverse sides of the insert, to impart physical deformation on the insert and to expand at least a portion of the insert radially outward, and to thus expand the selected hole radially outward, so that residual compressive stress is provided at the hole to enhance fatigue life of the hole in which the insert is installed.

FIG. 32 illustrates the enlarged indentations in the annular, ring-shaped insert, before the step of machining a working hole of desired size in the insert, in the manner first shown in FIG. 3 above.

FIG. 33 shows the appearance of a final installed straight wall bushing in a metal structure, using as an insert an annular ring-shaped plug-like starting insert, as prepared via the method just shown in FIGS. 30-32.

FIG. 34 illustrates an initial setup step in a method for installing an insert in a structure, using an "ring-shaped" plug-like starting insert.

FIG. 35 illustrates an indenting step for working on the deformable insert and on the structure just set forth in FIG. 34, utilizing opposing indenters on the obverse and reverse sides of the insert, to impart physical deformation on the insert and to expand at least a portion of the insert radially outward, and to thus expand the selected hole radially outward, so that residual compressive stress is provided at the hole to enhance fatigue life of the hole in which the insert is installed.

FIG. 36 illustrates the enlarged indentations in the ring-shaped insert, before the step of machining a working hole of desired size in the insert, in the manner first shown in FIG. 3 above.

FIG. 37 shows the appearance of a final installed straight wall bushing in a metal structure, using as an insert a ring-shaped plug-like starting insert, as prepared via the method just shown in FIGS. 34-36.

FIG. 38 shows an initial setup step in a method for installing an insert in a structure, using a solid plug starting insert against which opposing flat bottomed complementary shaped indenters act.

FIG. 39 illustrates an indenting step for working on the deformable insert and on the structure just set forth in FIG. 38, utilizing opposing indenters on the obverse and reverse sides of the insert to impart physical deformation on the insert and to expand at least a portion of the insert radially outward, and to thus expand the selected hole radially outward, so that residual compressive stress is provided at the hole to enhance fatigue life of the hole in which the insert is installed.

FIG. 40 illustrates the enlarged indentations in the ring-shaped insert, and the step of machining a working hole of desired size in the insert.

FIG. 41 shows the appearance of a final installed straight wall bushing, having an external flange portion, in a metal structure, using a solid plug as a starting insert, as prepared via the method just shown in FIGS. 38-40.

FIG. 42 illustrates an initial setup step in a method for installing an insert in a structure as a part of installation of a nut plate, using a hollow plug or bushing type starting insert element having a hollow nut retention element, including in cross-section, outwardly extending external flanges and upwardly extending ends forming a nut retention element for use in the installation of a nut.

FIG. 43 illustrates an indenting step for working on the deformable insert and on the structure just set forth in FIG. 42, utilizing opposing indenters on the obverse and reverse sides of the insert, to impart physical deformation on the insert and to expand at least a portion of the insert radially outward, and to thus expand the selected hole radially outward, so that residual compressive stress is provided at the hole to enhance fatigue life of the hole in which the insert is installed.

FIG. 44 illustrates the enlarged indentations in the ring-shaped bushing insert, before the step of machining a working hole of desired size in the insert, in the manner just shown in FIG. 40 above.

FIG. 45 shows the appearance of a final nut in a nut retention element on the bushing installed in the manner just shown in FIGS. 42-44 above.

In FIG. 50, the set up step for the use of opposing flat end indenters is shown for action against flat obverse and reverse sides of the solid plug.

In FIG. 51, illustrates an indenting step for working on the deformable insert and on the structure just set forth in FIG. 50, utilizing opposing indenters on the obverse and reverse sides of the insert, to impart physical deformation on the insert and to expand at least a portion of the insert radially outward, and to thus expand the selected hole radially outward, so that residual compressive stress is provided at the hole to enhance fatigue life of the hole in which the insert is installed.

FIG. 52 illustrates the enlarged indentations in the insert, before the step of machining a working hole of desired size in the insert.

FIG. 53 shows the appearance of a final nut in a nut retention element on the bushing fabricated and installed in the manner just shown in FIGS. 50-52 above.

FIGS. 54 through 64 show various configurations of flushness in various installed inserts.

FIG. 54 shows the use of a flush mounted insert.

FIG. 55 shows the use of an underflush mounted insert.

FIG. 56 shows the use of an overflush mounted insert.

FIG. 57 shows the use of a double underflush mounted insert.

FIG. 58 shows the use of a double overflush mounted insert.

FIG. 59 shows the use of flanged insert in flush configuration.

FIG. 60 shows the use of a flanged insert in underflush configuration.

FIG. 61 shows the use of a flanged insert in overflush configuration.

FIG. 62 shows the use of nut retention elements with an insert having a flush configuration.

FIG. 63 shows the use of a nut retention element with an insert having an underflush configuration mounted in a selected hole.

FIG. 64 shows the use of a nut retention element with an insert having an overflush configuration in a selected hole.

FIG. 67 illustrates an indenting step for working on the deformable insert and on the structure, using opposing indenters on the obverse and reverse sides of the insert, to impart physical deformation on the insert and to expand at least a portion of the insert radially outward, and to thus expand the selected hole radially outward, so that residual compressive stress is provided at the hole to enhance fatigue life of the hole in which the insert is installed in a beveled metal structure.

FIG. 68 illustrates the indentations in the plug type insert, before the step of machining a working hole of desired size in the insert.

FIG. 69 illustrates the step of milling the overflush portion of the installed bushing to make the bushing flush with a sloping beveled edge of a metal structure.

FIG. 70 shows the appearance of a nut retention element on the bushing installed in the manner just shown in FIGS. 67-69 above.

In FIG. 78, a solid plug having an overflush countersink head on the first end and an overflush second end is inserted into suitably prepared metal structure of complementary size and shape.

FIG. 79 illustrates in cross-section an indenting step for working on the deformable insert and on the structure, using opposing indenters on the obverse and reverse sides of the insert, to impart physical deformation on the insert and to expand at least a portion of the insert radially outward, and to thus expand the selected hole radially outward, so that residual compressive stress is provided at the hole to enhance fatigue life of the hole in which the countersink head insert is installed in a metal structure.

FIG. 80 illustrate in cross-section the indentations in the plug type insert, before the step of milling the overflush portion of the countersink head of the installed bushing to make the first end of the bushing flush with a first surface of the metal structure.

FIG. 88 shows the three components utilized in one embodiment of a nutplate design, in addition to showing a selected hole in a metal structure in which the nutplate is installed as set forth in FIGS. 89-91 below.

FIG. 89 illustrates the indentation step for installation of one embodiment of a nutplate in a metal structure, showing opposing indenters on the obverse and reverse sides of the insert to impart physical deformation on the insert and to expand at least a portion of the insert radially outward, and to thus expand the selected hole radially outward, so that residual compressive stress is provided at the hole to enhance fatigue life of the hole in which the insert is installed, with the insert having a nut retention flange element.

FIG. 90 illustrates the enlarged indentations from opposing, smooth, perhaps uniform pressure profile indenters in the plug-like insert, before the step of machining a working hole of desired size in the insert.

FIG. 91 shows the step of installing a nut in the nutplate recess element, and shows the step of installing a retaining cap with internal ridge configured for snap fit over and interfitting engagement with an outer peripheral groove located on the outer flange portion of the nut retention element.

FIG. 92 provides a top plan view of the installed nutplate as described in FIGS. 88-90.

FIG. 93 provides a cross-sectional view of the installed nutplate as described in FIGS. 88-91 above, now showing the internal ridge of the retaining cap in final, installed location relative to the outer peripheral groove located on the outer flange portion of the nut retention element.

FIGS. 94-98 provide for construction of nutplates similar to that described in FIGS. 88-90, but now show fabrication starting with use of a solid plug insert.

In FIG. 94, a perspective view is provided to show installation of a retaining cap over a nut in place in a nutplate recess element, although the nut in FIGS. 95-98, it would be placed as indicated in FIG. 94.

In FIG. 96, the retaining cap is shown affixed to the nutplate recess element, although the nut is not shown, it would be placed as indicated in FIG. 94.

In FIG. 97, yet another embodiment is provided for a retaining cap, here upwardly and inwardly directed lands are provided to retain the cap to the nutplate recess element.

In FIG. 98, the retaining cap just illustrated in FIG. 97 is shown affixed to the nutplate recess element, and although the nut is not shown, it would be placed as indicated in FIG. 94.

Figure 103:
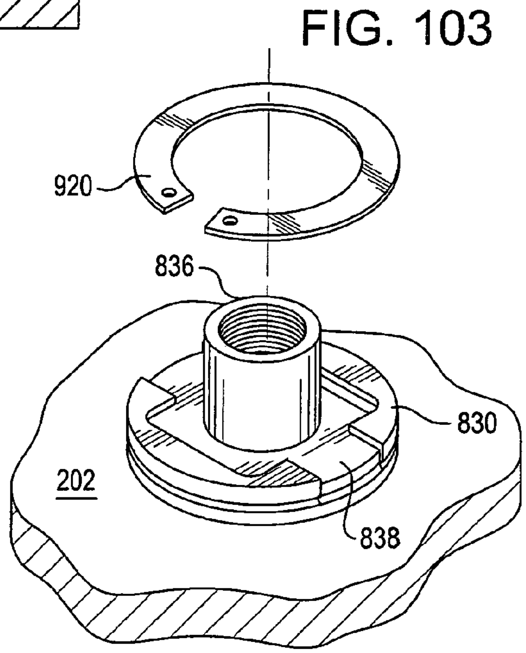
FIGS. 103-106 illustrate yet another embodiment of an exemplary nutplate design, here showing the use of an installed bushing with nutplate recess element, a floating nutplate for location in the nutplate recess element, and the use of an internal snap ring within the nutplate recess element to retain the nutplate within the nutplate recess element.

A perspective view is provided of the snap ring, nut, and nutplate recess element in FIG. 103.

Figure 104:
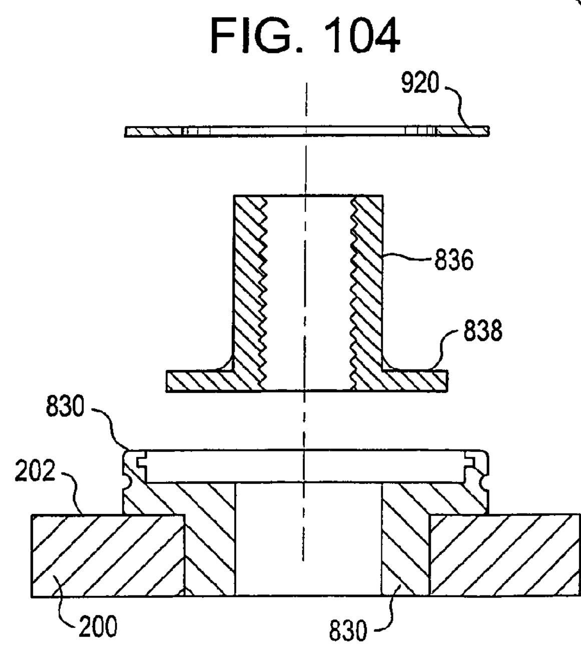

FIG. 104 provides an exploded cross sectional view of the nutplate design first shown in FIG. 103, now showing in further detail the internal snap ring retaining slot within the vertical portions of the flanged external head of the nutplate recess element.

Figure 105:
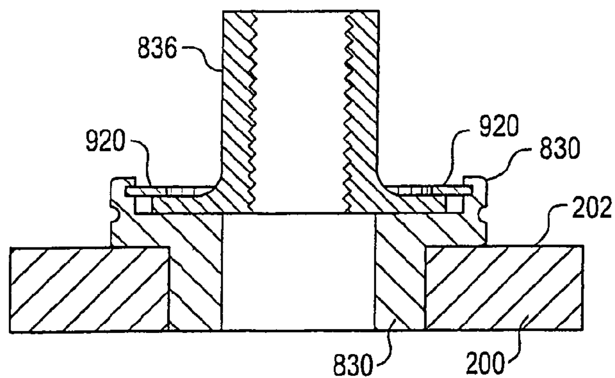

FIG. 105 provides a vertical cross-sectional view of a fully installed nutplate of the design illustrated in FIGS. 103 and 104.

Figure 106:
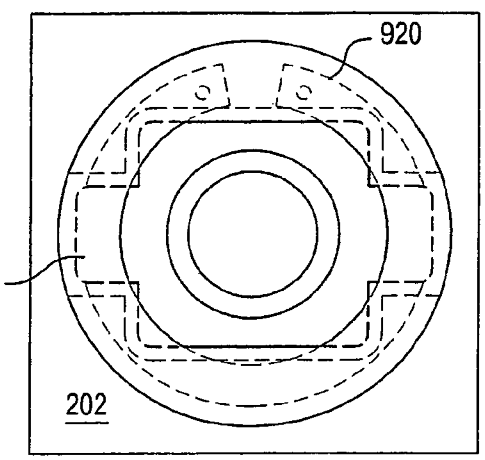

FIG. 106 provides a top plan view, taken looking down on the nutplate, showing the snap ring retaining the floating nut in the nutplate recess element.

Figure 107:
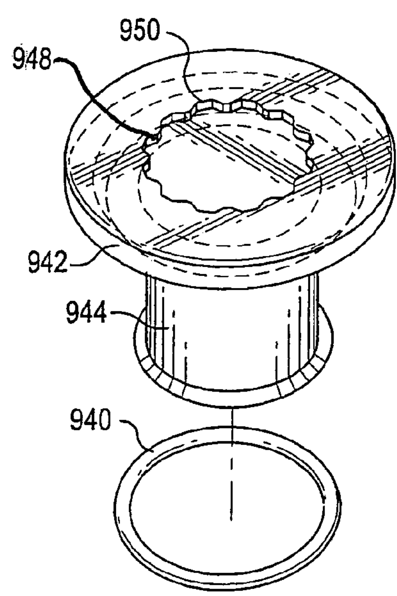
Figure 108:
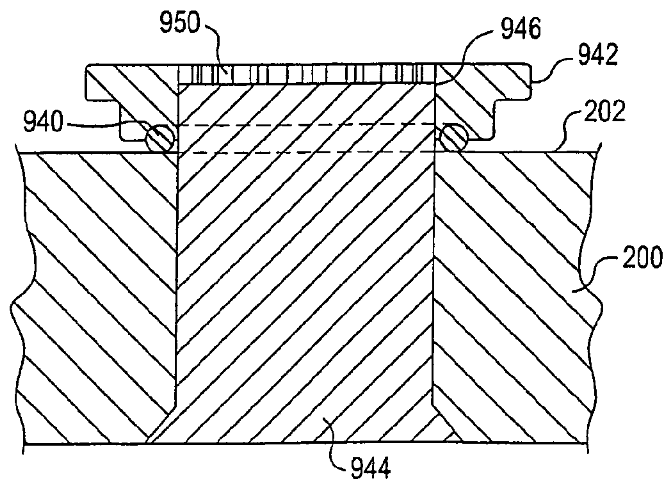

FIGS. 107 and 108 provide a sealing plug design element, showing an o-ring seal installed in the underside of a flanged head installed on an overflush plug insert.

FIG. 107 provides a perspective view of the sealing plug design, showing the o-ring seal loose, although it normally would be provided assembled with the flanged head and ready for installation between the flanged head and a first surface of the metal structure.

FIG. 108 shows a vertical cross-sectional view of the flange installed on a metal structure in order to seal against leakage outward along the sidewalls of the installed plug.

FIG. 109 illustrates the use of a roughened peripheral sidewall on an insert (same illustration applies whether the insert is a solid plug or a bushing) of the various types illustrated herein above.

FIG. 110 provides further detail of a roughened surface of the sidewall just illustrated in FIG. 109 further depicting the addition of microencapsulated glue.

FIG. 111 depicts the use of micro fluted or knurled surface of an insert.

FIG. 112 provides further enlarged detail of one embodiment of a micro fluted or knurled surface of an insert, here showing axially extending ridges and grooves having slightly radiused corners therebetween.

Figure 18:
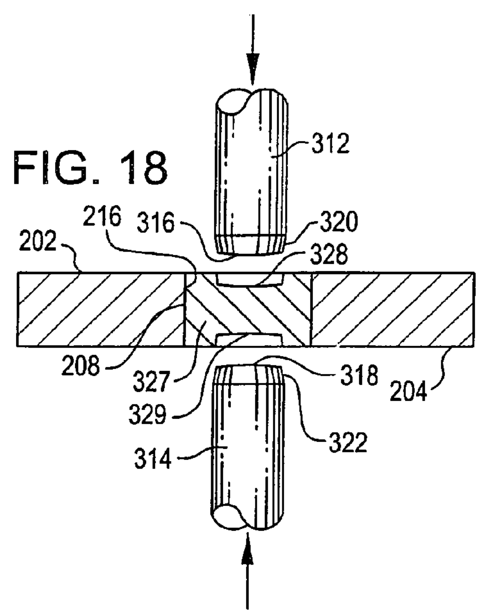
FIG. 18 illustrates an initial setup step in a method for installing an insert in a structure, using an "H-shaped" plug-like starting element that has first and second ends which are flush mounted in a metal structure.
Figure 113:
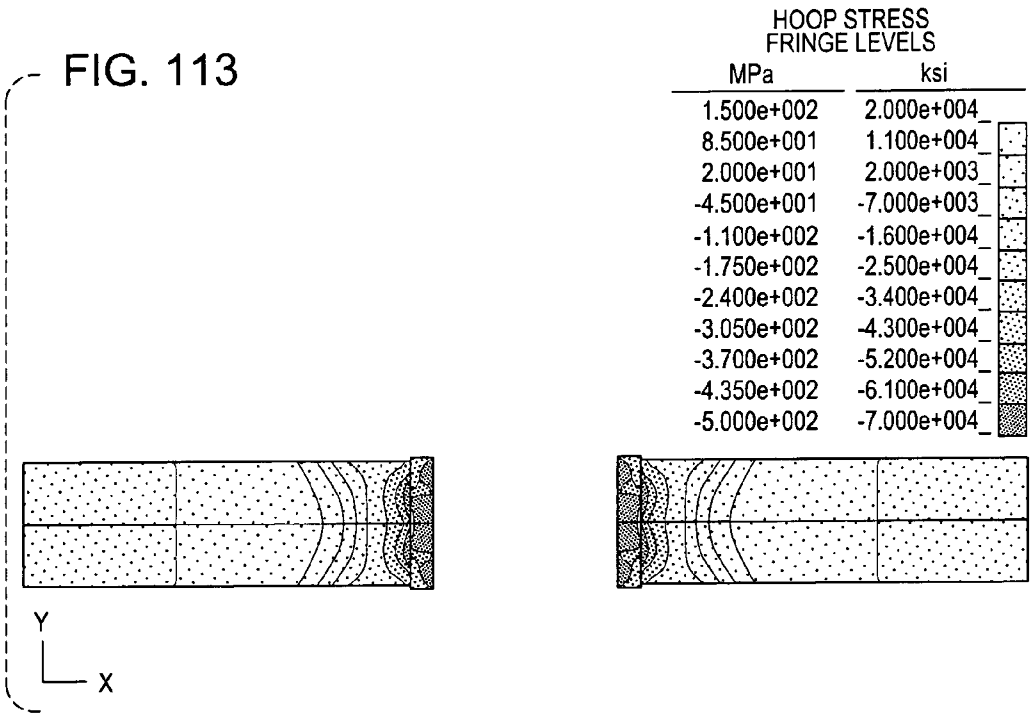

FIG. 113 is a color stress analysis of the hoop stress in the bushing and adjacent metal structure in one version of a new rivetless nut plate or bushing as described herein such as in FIG. 18, using a hole diameter of 0.375 inches and a metal structure thickness of 0.250 inches, when using 7075-T73 aluminum bushing and a 2024-T351 aluminum metal structure, using a contact force of 30,570 pounds force and driving each indenter 0.0315 inches, when using a starting hole diameter of 0.456 inches.

Figure 114:
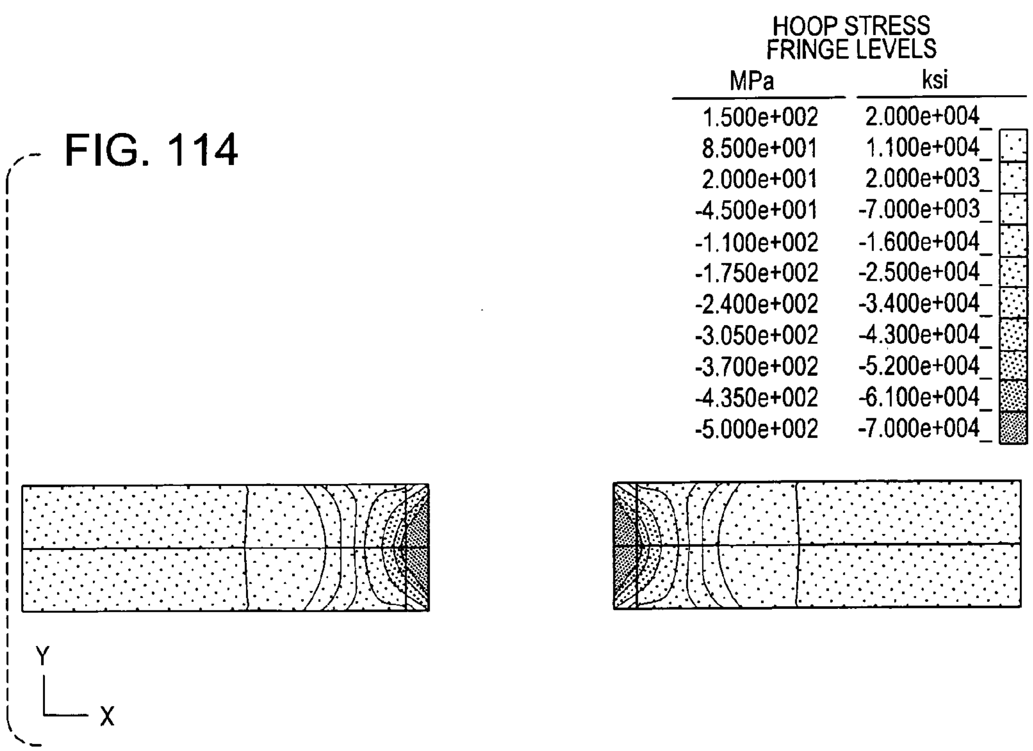

FIG. 114 is a color stress analysis of the hoop stress in the bushing and adjacent metal structure in one version of a new rivetless nut plate or bushing as described herein such as in FIG. 1, using a hole diameter of 0.375 inches and a metal structure thickness of 0.250 inches, when using 7075-T73 aluminum bushing and a 2024-T351 aluminum metal structure, using a contact force of 13,080 pounds force and driving each indenter 0.020 inches, when using a starting hole diameter of 0.456 inches.

Figure 22:
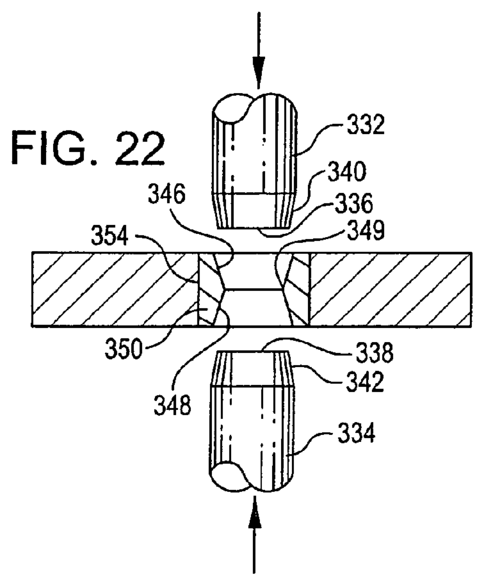
FIG. 22 illustrates an initial setup step in a method for installing an insert in a structure, using an "ring-shaped" plug-like starting element having, in cross-section, opposing inward pointing pentagonal portions that provide inwardly (radially) and inwardly (axially) sloping walls against which a complementary shaped indenter acts.
Figure 115:
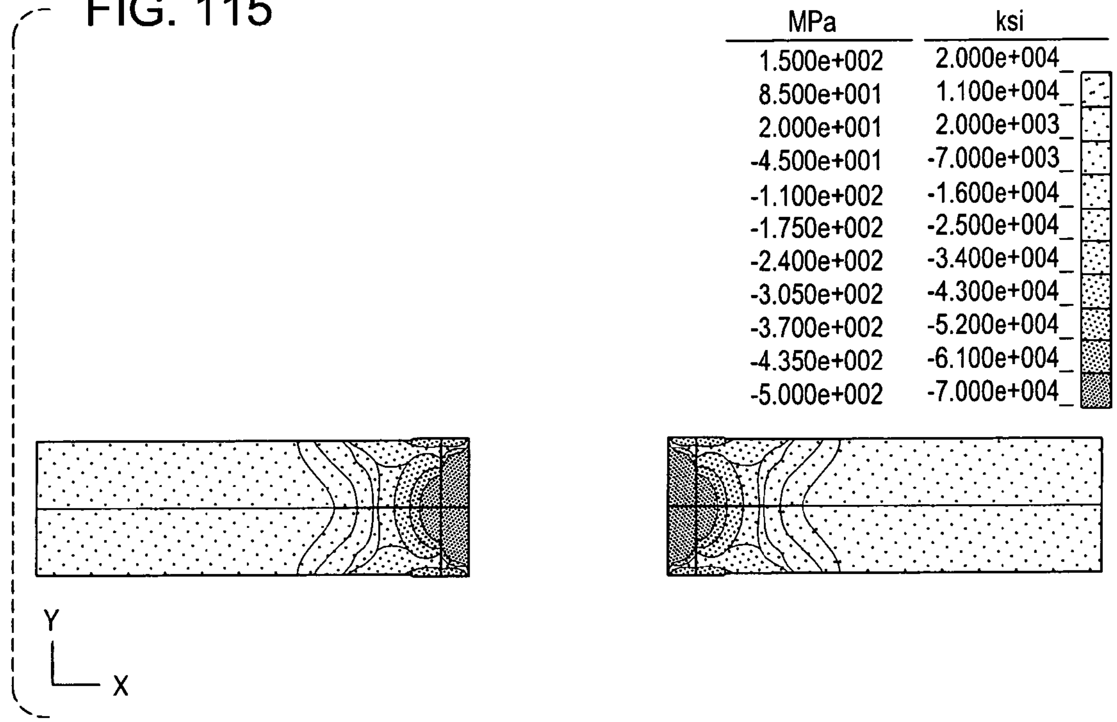

FIG. 115 is a color stress analysis of the hoop stress in the bushing and adjacent metal structure in one version of a new rivetless nut plate or bushing as described herein such as in FIG. 22, using a hole diameter of 0.375 inches and a metal structure thickness of 0.250 inches, when using 7075-T73 aluminum bushing and a 2024-T351 aluminum metal structure, using a contact force of 6,020 pounds force and driving each indenter 0.056 inches, when using a starting hole diameter of 0.456 inches.

Figure 116:
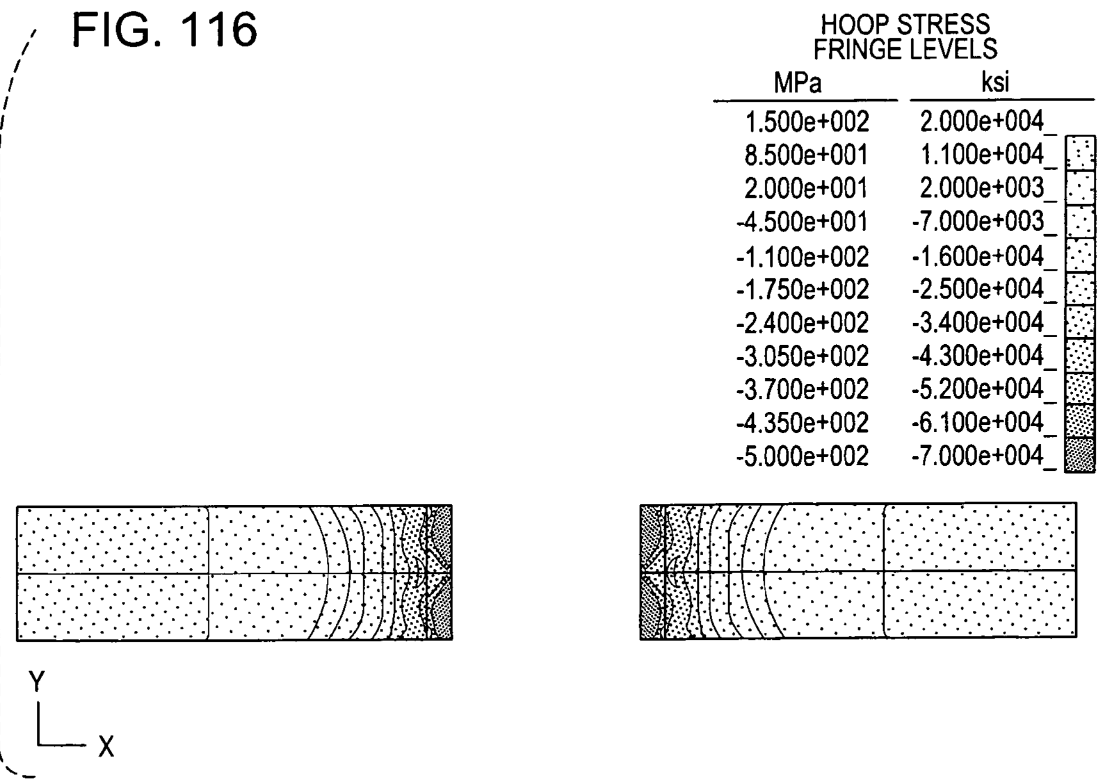

FIG. 116 is a color stress analysis of the hoop stress in the bushing and adjacent metal structure in one version of a new rivetless nut plate as described herein such as in FIG. 22, using a hole diameter of 0.375 inches and a metal structure thickness of 0.250 inches, when using 7075-T73 aluminum bushing and a 2024-T351 aluminum metal structure, using a contact force of 5,360 pounds force and driving each indenter 0.0315 inches, when using a starting hole diameter of 0.456 inches.

Figure 117:
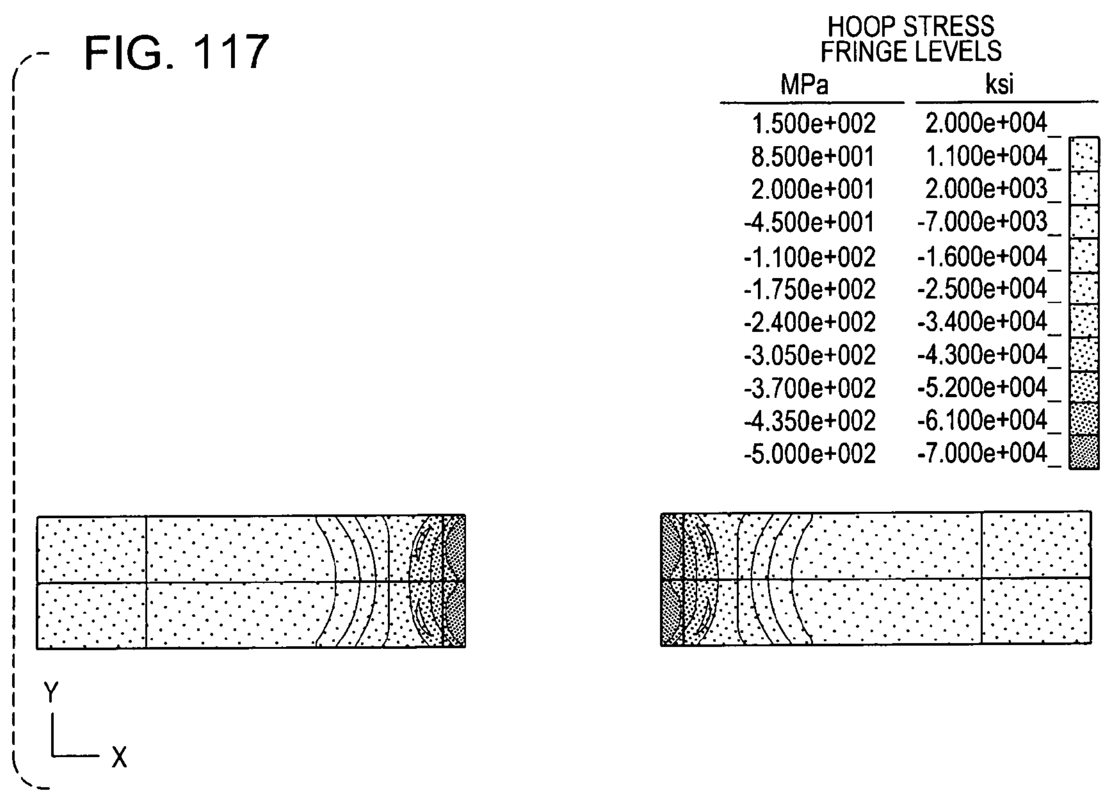

FIG. 117 is a color stress analysis of the hoop stress in the bushing and adjacent metal structure in one version of a new rivetless nut plate as described herein such as in FIG. 22 (i.e., similar to that depicted in FIG. 116), using a hole diameter of 0.375 inches and a metal structure thickness of 0.250 inches, when using 7075-T73 aluminum bushing and a 2024-T351 aluminum metal structure, when using a starting hole diameter of 0.456 inches, when using a contact force of 5,710 pounds force and driving each indenter 0.038 inches.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of unique method and apparatus for securing a blind nut attachment are also shown and briefly described to enable the reader to understand how various features, including optional or alternate features, may be utilized in order to provide an efficient, fatigue resistant, low cost nut plate design, which can be manufactured in a desired size and configuration for providing a long lasting component.

DETAILED DESCRIPTION

Rivetless nutplates, plugs, and bushings are advantageously installed utilizing a novel method, wherein a plug, bushing, or nutplate stem portion expanded radially when in a selected hole in a structure. Such methods, and the unique structures disclosed, provide a method for installation of bushings, rivetless nut plates, and plugs, which is amenable to automated environments. Also, this novel method, and the structures disclosed made thereby, utilize tooling and bushing designs with less restrictive dimensional tolerances than inherent in prior art methods and structures. Both of these factors lead to a much simpler lower overall cost solution for installation of rivetless nut plates. The methods and structures disclosed thus (a) facilitate the attachment of panels, doors, or other structures to reduce fabrication costs, (b) enhance fatigue life of structures which such utilize the installation methods and nut plate designs, and (c) simplify the repair of damaged structures.

Bushings, whether straight or flanged, or rivetless nut plates, or plugs, or repair plugs or bushings, can be installed by axially compressing or impacting the ends of an undersized bushing or plug in a starting hole with tools generally described as indenters. The installation method causes (A) a permanent reductions in length, locally at the dimple created by the method, and (B) an increase in diameter of the bushing, rivetless nut plate or plug. The increase in diameter of the bushing element or plug produces a radial plastic flow of material both (1) in the bushing or plug and (2) in the aperture wall, thereby creating interference with the wall. The radial plastic flow of the aperture wall material has an added benefit in that it produces a compressive residual stress in the wall surrounding the hole. The compressive stress has been found to be beneficial at improving the fatigue life of the wall. To finish the installation, the inside diameter of bushing or nut plate is drilled out as part of the installation procedure to form a working hole of desired size and shape. This procedure may be tailored for proper fastener fit without need for another separate nut plate. For plugs, this installation method may require only the shaving of the ends of the plug. Both the bushing element and plug allow the improved nut plate to be installed using squeeze, or impact, forces from both sides of the wall, or, alternately in appropriate situations, retaining forces (via an anvil or the like) on one side of the wall.

Since there are basically only two dimensional elements in the installation, (1) the starting hole diameter in the wall, and (2) the bushing or plug diameter, there is much less "bandwidth" in the tolerance stackup. A third variable in the installation is the amount of applied force or impact required to properly squeeze the plug into the wall. Such required force will vary widely depending upon the materials used both (a) for the plug, bushing or nutplate, and (b) for the metal structure in which the installation is provided. However, once determined for a specific set of materials and fatigue life enhancement desired for the hole, this force, as well as displacement, can be controlled to a high degree in most automated production environments. The degree of interference fit of the nut plate to the starting hole in the wall is thus governed by the amount of impact or squeeze. This flexibility is highly desired for ensuring the reliability of the installation for a range of wall thicknesses and hole diameters. These factors allow for less restrictive tolerances, thereby reducing manufacturing costs.

Figure 16:
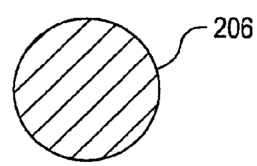
FIG. 16 shows is a cross-sectional view of one desirable insert shape, namely cylindrical in cross-section, as noted as viewed through line 16-16 of FIG. 12 above.
Figure 81:
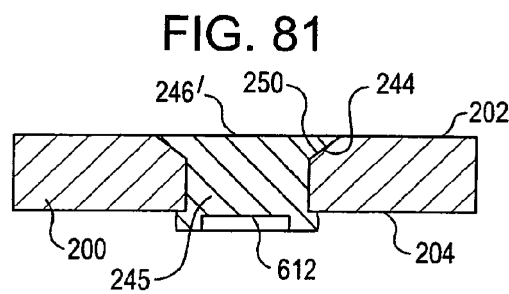
FIG. 81 provides a cross-sectional view of an installed plug having a countersink head flush with a first surface of a metal structure.

FIGS. 1 though 4 illustrate the manufacture of a desired working hole $H_W$, the shape of which is indicated by bushing 206 having, after hole formation, internal sidewall portions 198 extending through a metal structure 200 between obverse 202 and reverse surfaces 204. This technique of manufacture of a working hole $H_W$ can be utilized for providing, repairing, or repositioning a hole H in a metal 200. The first step in such a method is providing a selected hole of suitable size and shape through the structure 200 from the obverse surface 202 to the reverse surface 204, by (i) inspection and acceptance of sidewall portions 208 of a pre-existing hole to provide a selected starting hole $H_1$, or (ii) enlargement or rework of a pre-existing hole to provide at least some new sidewall portions to provide a selected starting hole $H_1$, or (iii) if no hole exists, providing a new starting hole with new sidewall portions to provide a selected starting hole $H_1$. Then, a physically deformable metal insert 206 is provided having a body portion 207. The insert 206 is sized and configured so as to be capable of frictionally engaging the sidewall portions of the selected starting hole 208. The body portion 207 has first 212 and second 214 ends and peripheral wall 216 extending for a length between said first 212 and second 214 ends to permit the body portion 207 to be inserted at least partially within the selected starting hole 208. Then, the deformable metal insert 206 is inserted into the selected starting hole 208 so that the body portion 207 extends at least partially within the selected starting hole 208 and the peripheral wall 216 of the insert 206 is adjacent at least a portion of the sidewall of the hole 208. After insertion of the insert 206, the insert is subjected to physical deforming forces to cause the insert 206 to be deformed and to frictionally engage at least some of the sidewall portions of the selected hole 208, and to cause at least a portion of the body portion 207 of the insert 206 to be radially displaced and at least some of said metal structure 200 adjacent hole 208 to be radially displaced sufficient to cause at least some of the sidewall portions of said selected starting hole 208 to exert compressive forces against the sidewall 216 of the insert 206 to a degree sufficient to enhance fatigue life of the hole 208 surrounding the insert 206 and to substantially fix the insert 206 within the selected starting hole 208. The physically deformation of the insert 206 may include making indentations 211 and 213 in insert 206 via use of indenters, further discussed herein below. The method further includes the step of forming a working hole $H_W$ axially through the insert 206, using a suitable tool such as drill 217, extending through insert 206 from the first end 212 to the second end 214 of the insert 206. The insert 206 may, but not necessarily, be provided in a cylindrical configuration, as indicated in FIG. 16. Accordingly, the insert 206 can also be provided in a suitable non-cylindrical configuration when appropriate. For example, as set forth in FIG. 17, an insert 236 can be provided in an eccentric configuration, such as in a shape having an elliptical configuration, in cross-section. Also, as shown in FIGS. 3 and 4, a circular drill can be utilized to provide a working hole $H_W$ having a cylindrical configuration. Also, as will be further discussed in connection with FIGS. 78-81, the sidewall portions 240 of a starting hole 242 can be provided with a countersink shoulder 244. In such cases, an insert 245 further includes, at either the first 246 or second 248 end, a countersink head portion 250. After milling, a new first end 246' may be provided, flush with first surface 202, as indicated in FIG. 81.

Figure 65:
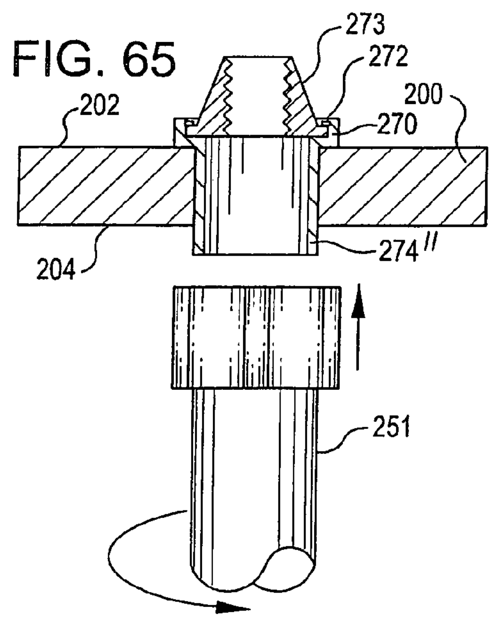
FIG. 65 illustrates the step of milling an overflush lower end of an installed bushing, in order to provide a finished bushing with nut retention element and nut, as illustrated in FIG. 66.
Figure 66:
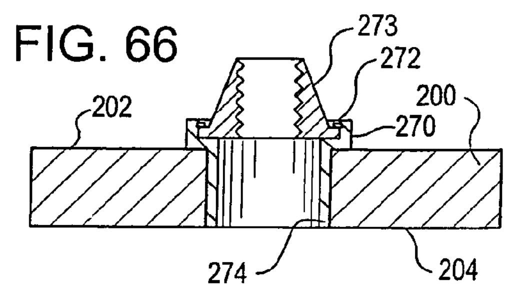
FIG. 66 provides an illustration of the finished product from the milling step just shown in FIG. 65.
Figure 67:
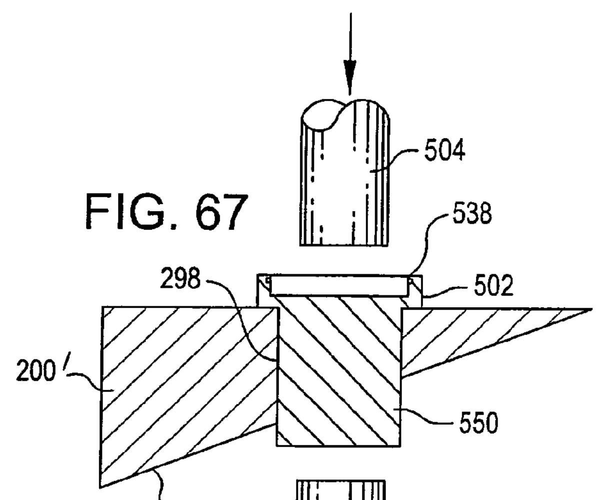
FIGS. 67-70 are similar to the view first shown in FIGS. 38-41, but now further illustrate the use of opposing indenters acting on a solid plug type insert having an upper flange with a nut retention element being mounted on a beveled structure.
Figure 68:
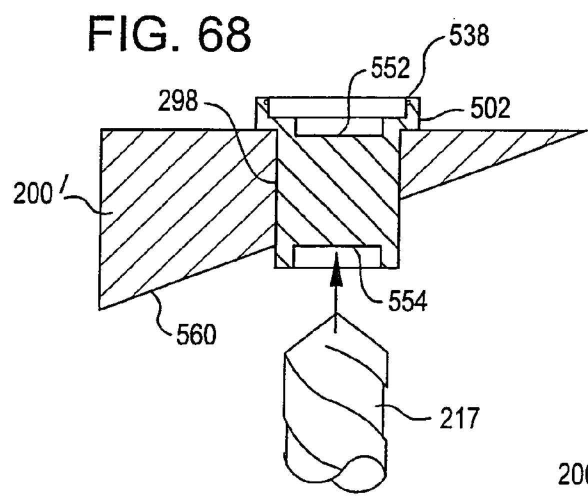
Figure 69:
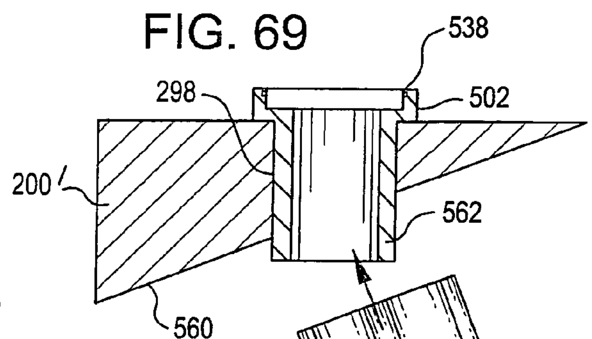
Figure 70:
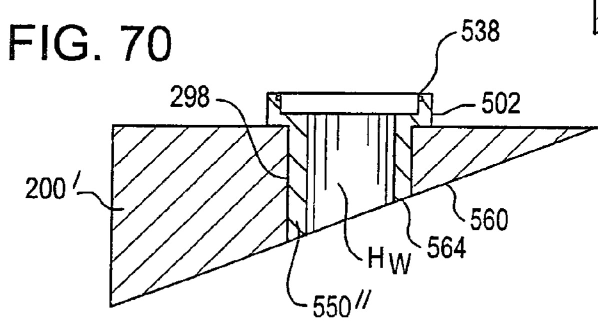
Figure 71:
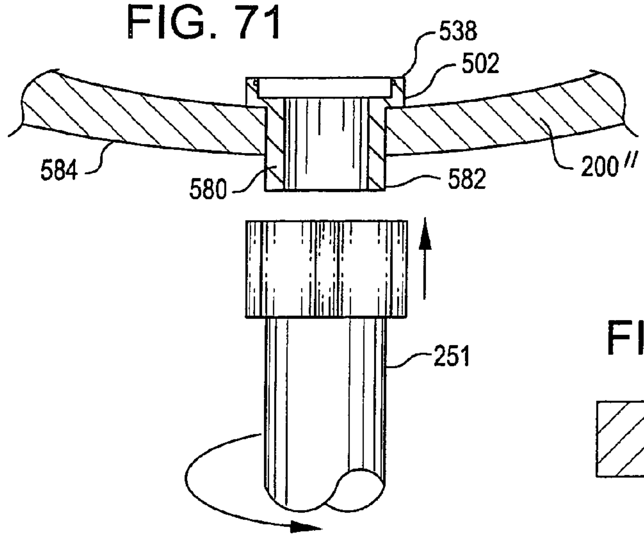
FIG. 71 illustrates the step of milling an overflush portion of an installed bushing to make the bushing flush with a curved surface of a metal structure.
Figure 72:
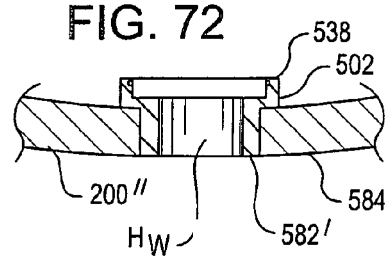
FIG. 72 shows the appearance of a nut retention element on the bushing installed in the manner just shown in FIG. 71 above.

Various configurations of providing an insert may be quite useful for specific circumstances, as can be seen by comparison of FIGS. 54 through 64. As first shown in FIGS. 1-4, an insert 206 is provided sized and shaped wherein after insertion, the insert 206 is positioned in a flush configuration with respect to the first 202 and second 204 surfaces of the metal structure 200 to provide working hole $H_{W}$. But, in FIG. 55, another insert 206' is positioned in an underflush configuration with respect to the first 202 and second 204 surfaces of the structure 200 to provide working hole $H_{W'}$. Alternately, in FIG. 57, another insert 206" is positioned in a double underflush configuration with respect to the first 200 and second 202 surfaces of the structure 200 to provide working hole $H_{W''}$. Yet another configuration is shown in FIG. 56, where, after insertion the insert 206'" is positioned in an overflush configuration with respect to the first 202 and second 204 surfaces of the metal structure 200. In still another configuration, an insert 206"" is positioned in a double overflush configuration with respect to the first 202 and second 204 surfaces of the structure 200, to provide a working hole $H_{W''''}$. In various figures, such as FIG. 65, FIG. 67 or FIG. 69, it can be appreciated that a suitable method may include, after subjecting the insert to physical deforming forces, the step of removing at least some of an overflush portion of the insert via a milling or other suitable machine operation. Such an operation may be conducted using a mill 251 on a flat metal structure 200 as in FIG. 65, or a beveled metal structure 200' as seen in FIG. 67, or with a curved metal structure 200" as seen in FIGS. 71 and 72. After such a milling operation, when an overflush portion has been removed from an insert, then the milled end (either the first or second end of that insert) is flush with either the first 202 or second 204 surface of the structure, respectively, for example if structure 200 is used.

As further indicated in FIG. 59 a flush insert 260 can be provided having an external flanged head portion 262. Alternately, as seen in FIG. 60, an underflush insert 260' can be provided having an external flanged head portion 262 extending radially outward from the hole $H_{W}$. And in yet another embodiment shown in FIG. 61, an overflush insert 260" can be provided having an external flanged head portion 262. In each of these embodiments, a suitable working hole $H_{W}$, $H_{W'}$, or $H_{W''}$ can be provided in desired final dimensions.

Figure 17:
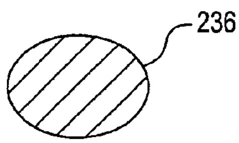
FIG. 17 is a cross-sectional view of yet another desirable insert shape, namely an eccentric cross-sectional shape, as if taken across a line similar to that of 16-16 of FIG. 12.

Similar to the configuration just discussed with respect to FIGS. 59-61, inserts can be provided with a flange which includes nut retaining elements suitable for use in a nut plate assembly, as indicated in FIGS. 62-64. In FIG. 62, the flange 270 including nut retaining element 272 is provided on a bushing 274 which is mounted flush with the upper surface 202 of metal structure 200. In FIG. 63, the flange 207 including nut retaining element 272 for retaining a floating nut 273 is provided with a bushing 274' which mounted in an underflush configuration with respect to the lower surface 204 of metal structure 200. And, in FIG. 64, the bushing 274" is mounted in an overflush configuration with respect to lower surface 204 of metal structure 200. Also, as shown in FIG. 17, a non-circular feature can be provided in the body portion of an insert, and a complementary shape provided in a hole, for deformation of the insert within the selected hole for any of the various configurations shown in FIGS. 54 through 66, and in such an event, the non-circular features extends axially from the first surface 202 to the second surface 204 adjacent the selected hole $H_{W}$. In such cases, the hole.

Various structure shapes may benefit from the installation of nutplates, plugs, or bushings according to the present invention. As shown in FIG. 1, for example, the metal structure 200 can be a flat structure having uniform cross-sectional dimension adjacent said selected hole 216. Or as shown in FIGS. 67-70, the metal structure 200' can have a non-uniform cross-sectional dimension adjacent said selected hole 298, including a beveled shape as shown in these FIGS. 67-70. Also, as shown in FIGS. 71 and 72, a metal structure 200" can be curved.

In the various embodiments of the method illustrated, the step of subjecting the insert to physical deforming forces includes the use of a first indenter 280 to act on the first end 212 of the insert such as insert 206 shown in FIG. 1. Also, the step of subjecting the insert 206 to physical deforming forces includes the use of a second indenter 282 to act on the second end 214 of an insert such as insert 206 in FIG. 1. Various indenter shapes may be provided, some of which are indicated in FIGS. 5 through 11. The first indenter 280 or second indenter 282 can be provided, where appropriate, in a non-round cross-section such as those indicated in FIGS. 9, 10, and 11 where respectively, an eccentric indenter shape 290 is provided, a rectangular shape 292 with radiused corners 293 is provided, and a polygonal shape 294 (here, hexagonal) indenter shape is provided. For most common cylindrical inserts, or for ring-like bushings, the use of an indenter with circular cross-section 296 as shown in FIG. 8 is provided. More commonly, many applications will benefit with use of a generally cylindrical indenter "I" as shown in FIGS. 5, 5A, 6, and 7, but with various working ends, such as a at least partially conical 300 as shown in FIG. 5, or a smooth, uniform pressure profile curve 302 as shown in FIG. 5A, which is configured to provide a uniform pressure to an insert, or an indenter I having a flat bottom 304 and beveled (chamfered) sidewall portions 306. Also, in some applications, an indenter 308 having an at least partially spherical working end 310 is useful, as indicated in FIG. 7.

Figure 12:
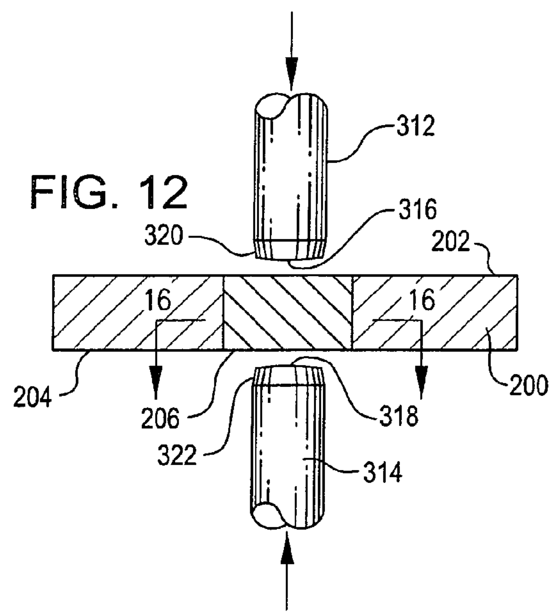
FIG. 12 illustrates an initial setup step in a method for installing an insert in a structure, using a solid plug-like starting element that is flush mounted in a metal structure, and using opposing indenters, each utilizing yet another indenter shape, here an outwardly contoured working end having beveled shoulder portions.
Figure 13:
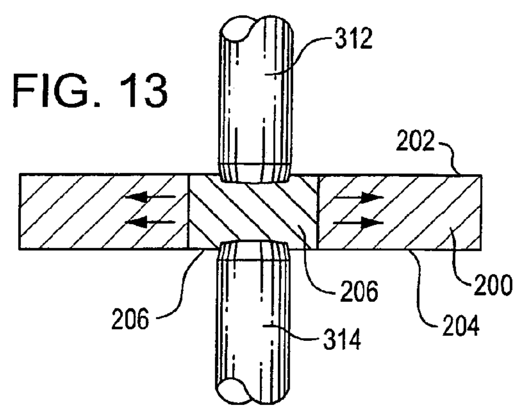
FIG. 13 illustrates an indenting step for working on the structure just set forth in FIG. 12, utilizing opposing indenters on the obverse and reverse sides of the insert to impart physical deformation on the insert and to expand at least a portion of the insert radially outward, and to thus expand the selected hole radially outward, so that residual compressive stress is provided at the hole to enhance fatigue life of the hole in which the insert is installed.
Figure 14:
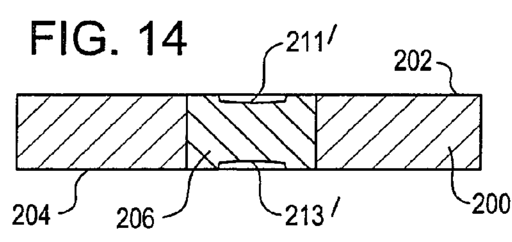
FIG. 14 illustrates the physically deformed insert, particularly noting indentations in the top and bottom of the insert, ready for the step of machining a working hole (not shown, but similar to FIG. 3 above) of desired size in the insert first shown in FIGS. 12 and 13.
Figure 15:
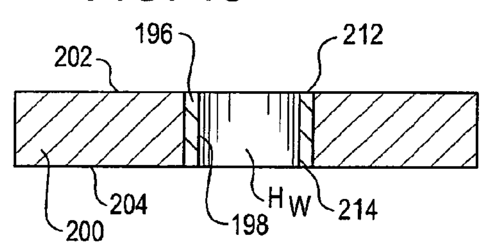
FIG. 15 shows the appearance of a final installed straight wall bushing in a metal structure, using as an insert a solid plug-like starting element, via the method just shown in FIGS. 12, 13, and 14.
Figure 19:
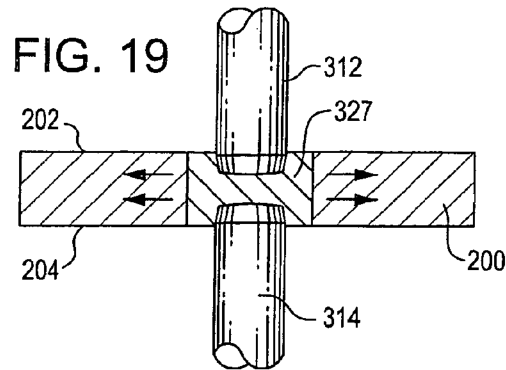
FIG. 19 illustrates an indenting step for working on the deformable insert and on the structure just set forth in FIG. 18, utilizing opposing indenters on the obverse and reverse sides of the insert to impart physical deformation on the insert and to expand at least a portion of the insert radially outward, and to thus expand the selected hole radially outward, so that residual compressive stress is provided at the hole to enhance fatigue life of the hole in which the insert is installed.
Figure 20:
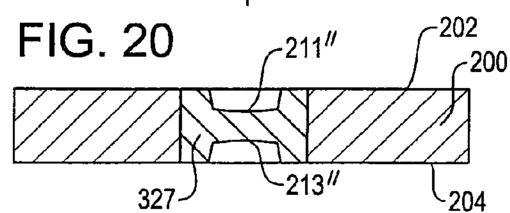
FIG. 20 illustrates the enlarged indentations in the H-shaped plug-like insert, before the step of machining a working hole of desired size in the insert, in the manner first shown in FIG. 3 above.
Figure 21:
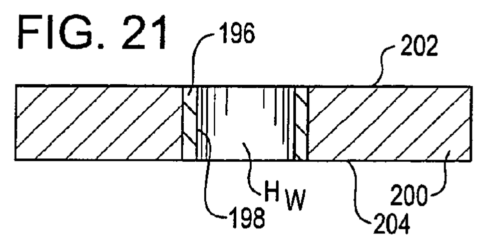
FIG. 21 shows the appearance of a final installed straight wall bushing in a metal structure, using as an insert an H-shaped plug-like starting insert, as prepared via the method just shown in FIGS. 18-20.

Yet further useful indenter shapes are shown in FIGS. 12 and 13, where first 312 and second 314 indenters are shown with a rounded face 316 and 318, respectively, and sloping sidewalls 320 and 322, respectively. When using such indenters, indentations 211' and 213' are provided by the indenters 312 and 314, respectively. Similar embodiments are provided in FIGS. 18 and 19, but with force and in a metal sufficient to cause deeper indentations 211" and 213", when starting with a generally H-shaped ring-like insert 327 having pre-existing indentations 328 and 329, which are configured to match, at least in part, the indenter sidewall shapes 320 and 322. After deformation of the insert 327, new indentations 211" and 213" are left extending from the axial center of the H-shaped insert 327. Then, the insert 327 is drilled out with drill 217 or similar tool to form a working hole $H_{W}$.

Figure 23:
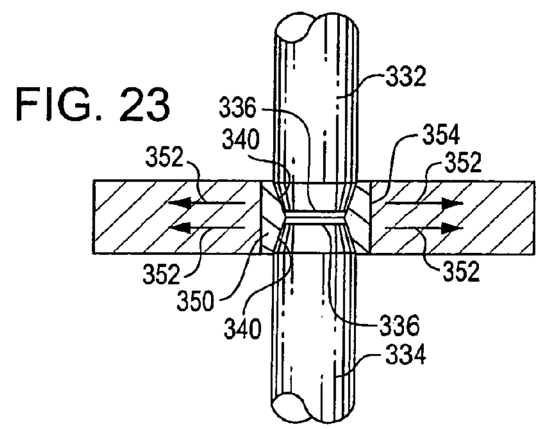
FIG. 23 illustrates an indenting step for working on the deformable insert and on the structure just set forth in FIG. 22, utilizing opposing indenters on the obverse and reverse sides of the insert, and particularly, on the inward (radial) and inward (axial) sloping sidewall portions of the insert bushing, to impart physical deformation on the insert and to expand at least a portion of the insert radially outward, and to thus expand the selected hole radially outward, so that residual compressive stress is provided at the hole to enhance fatigue life of the hole in which the insert is installed.
Figure 24:
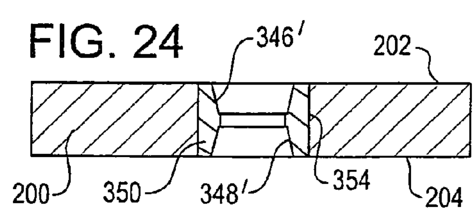
FIG. 24 illustrates the enlarged indentations in the ring-shaped insert, before the step of machining a working hole of desired size in the insert, in the manner first shown in FIG. 3 above.
Figure 25:
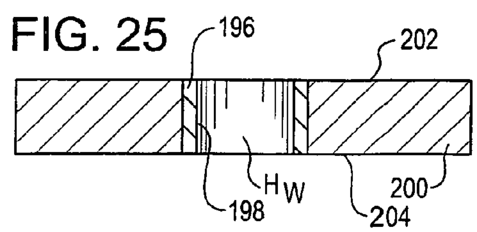
FIG. 25 shows the appearance of a final installed straight wall bushing in a metal structure, using as an insert a ring-shaped plug-like starting insert, as prepared via the method just shown in FIGS. 22-24.

A still further embodiment for useful indenter shapes is provided in FIGS. 23 and 23, where first 332 and second 334 indenters are shown with a flat face 336 and 338, respectively, and long sloping sidewalls, 340 and 342, respectively. In this embodiment, the long sloping sidewalls 340 and 342 are designed to match a preformed sidewalls 346 and 348 in ring-like insert 350 that has a cross-sectional profile of opposing pentagons, much in the shape of a baseball plate with the apex 349 of each in opposition at the axial center of the insert ring 350. Here, insert 350 is deformed to the shape illustrated in FIGS. 23 and 24, wherein the opposing pentagons have been deformed radially outward in the direction of reference arrows 352 outwardly to compress the hole edgewall portion 354 of metal structure 200 and move sidewalls 346 and 348 toward locations 346' and 348' as illustrated in FIG. 24. Finally, to prepare the working hole $H_{W}$, drill 217 is utilized in the manner shown elsewhere to prepare the final, finished annular bushing in metal structure 200 as indicated in FIG. 25.

Figure 26:
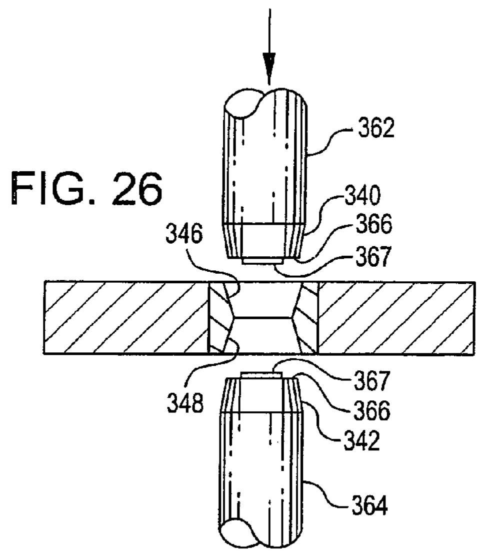
FIGS. 26-29 are similar to the view first shown in FIGS. 22-25, but now further illustrate the use of opposing indenters having opposing stop foot portions which limit inward axial travel of the opposing indenters, relative to the inserts provided.
Figure 27:
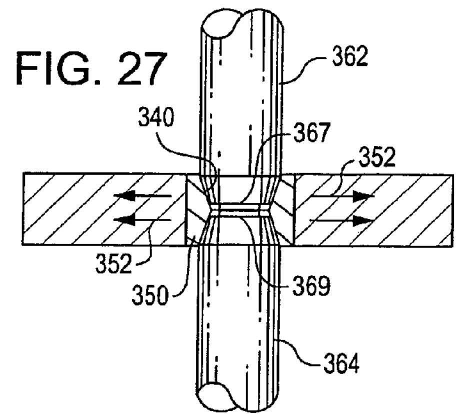
Figure 28:
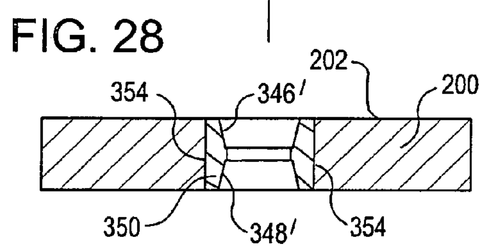
Figure 29:
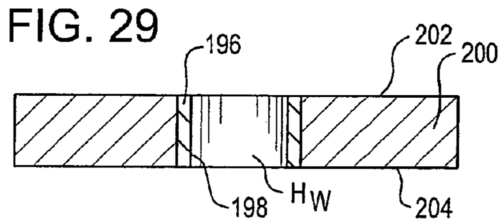

Yet another embodiment for useful indenter shapes is provided in FIGS. 26 and 27, wherein first 362 and second 364 indenters are shown with a flat face 366 and 368, and stops 367 and 369, respectively, and long sloping sidewalls 340 and 342, respectively. Again in this embodiment, the long sloping sidewalls 340 and 342 are designed to match preformed sidewalls 346 and 348 in a ring-like insert 350. Here, insert 350 is deformed to the shape illustrated in FIGS. 27 and 28, wherein the opposing pentagons have been deformed radially outward in the direction of reference arrows 352 outwardly to compress the hole edgewall portion 354 of metal structure 200 and move sidewalls 346 and 348 toward locations 346' and 348' as illustrated in FIG. 28. Finally, to prepare the working hole $H_W$, drill 217 is utilized in the manner shown elsewhere to prepare the final, finished annular bushing in metal structure 200 as indicated in FIG. 29.

Figure 30:
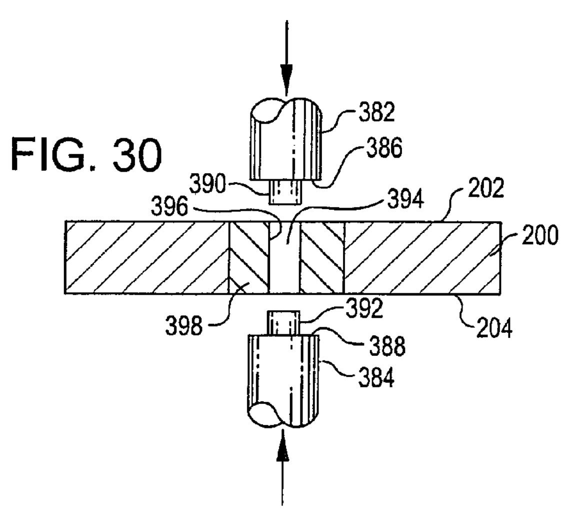
FIGS. 30-33 are similar to the views first shown in FIGS. 22-25, but now further illustrate the use of opposing indenters having opposing stop foot portions which limit inward axial travel of the opposing indenters, relative to the inserts provided, as well as providing, in this configuration, the function of a pilot nose sized and shaped to fit within an annular bushing.
Figure 31:
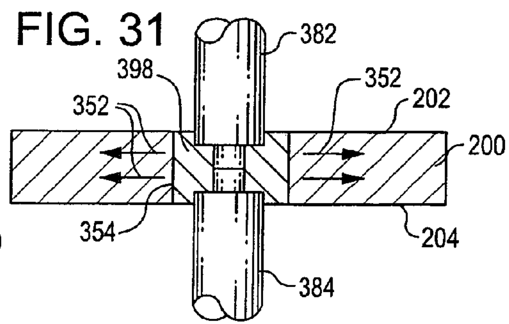
Figure 33:
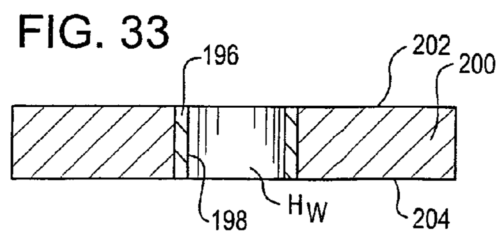
Figure 32:
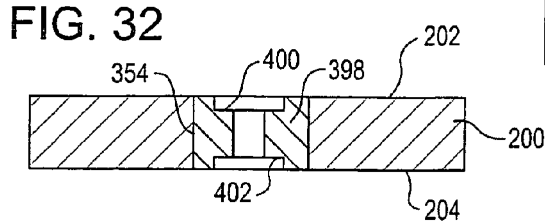

A still further embodiment for useful indenter shapes is provided in FIGS. 30 and 31, wherein first 382 and second 384 indenters are shown with a flat face 386 and 388, and cylindrical pilot nose portions 390 and 392, shaped and sized to fit in complementary sliding engagement with a central aperture 394 defined by interior sidewall 396 in annular bushing 398. Here, insert 398 is deformed to the shape illustrated in FIGS. 31 and 32, wherein the opposing indenters 382 and 384 have shaped indentations 400 and 402 (formed by faces 386 and 388) in insert 398. The insert 398 has been deformed radially outward in the direction of reference arrows 352 outwardly to compress the hole edgewall portion 354 of metal structure 200. Finally, to prepare the working hole $H_W$, drill 217 is utilized in the manner shown elsewhere to prepare the final, finished annular bushing in metal structure 200 as indicated in FIG. 33.

Figure 34:
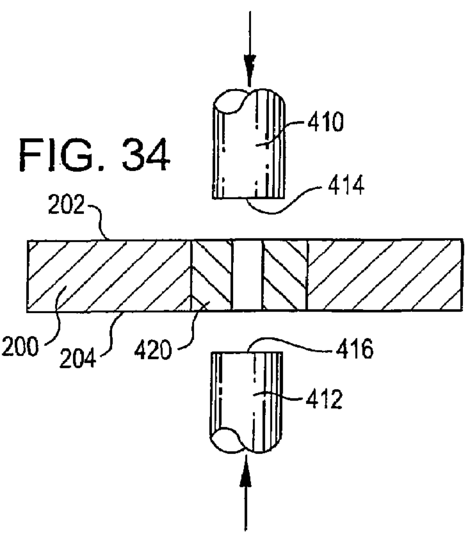
FIGS. 34-37 are similar to the view first shown in FIGS. 30-33-, but now illustrating the use of opposing indenters without a pilot nose or opposing stop foot portions.
Figure 35:
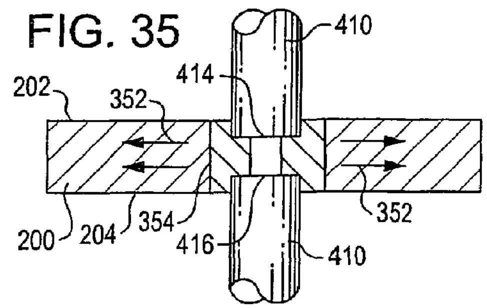
Figure 36:
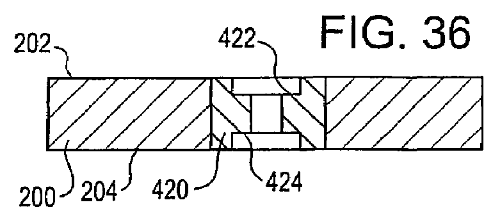
Figure 37:
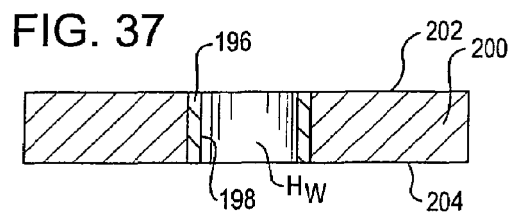

A still further embodiment for useful indenter shapes is provided in FIGS. 34 and 35, wherein first 410 and second 412 indenters are shown with a flat face 414 and 416 for acting on an annular bushing insert 420. Here, insert 420 is deformed to the shape illustrated in FIGS. 35 and 36, wherein the opposing indenters 410 and 412 have shaped indentations 422 and 424 (formed by faces 414 and 416) in insert 420. The insert 420 has been deformed radially outward in the direction of reference arrows 352 outwardly to compress the hole edgewall portion 354 of metal structure 200. Finally, to prepare the working hole $H_W$, drill 217 is utilized in the manner shown elsewhere to prepare the final, finished annular bushing insert in metal structure 200 as indicated in FIG. 37.

Figure 38:
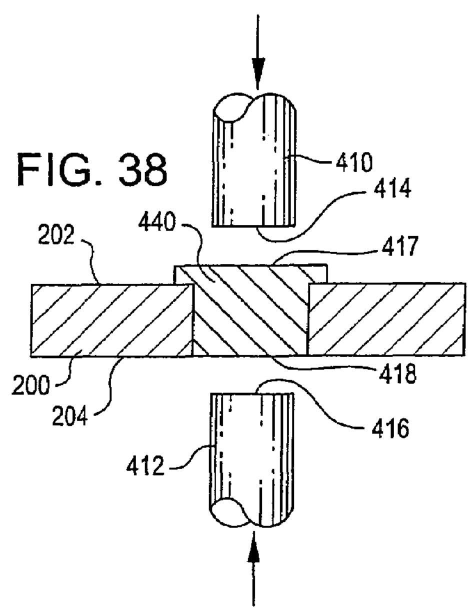
FIGS. 38-41 are similar to the view first shown in FIGS. 22-25, but now further illustrate the use of opposing flat bottomed indenters acting against a solid plug having complementary flat obverse and reverse sides, and wherein the obverse side of the plug further includes an exterior flanged portion suitable for use as a flanged bushing, or for use in installing a nut plate.
Figure 39:
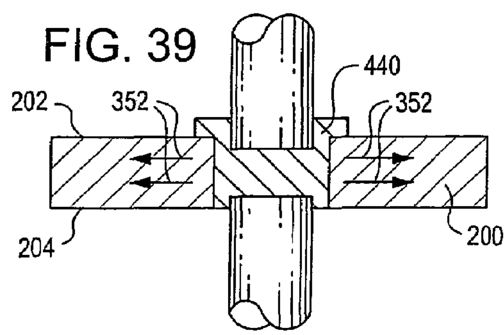
Figure 40:
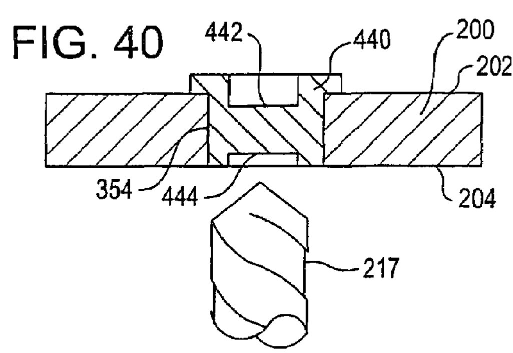
Figure 42:
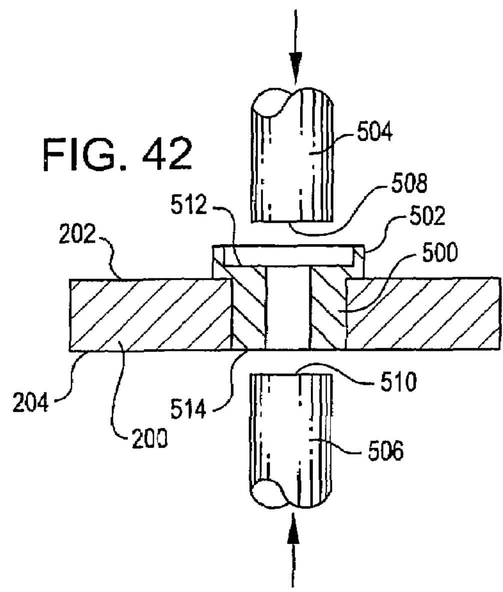
FIGS. 42-45 are similar to the view first shown in FIGS. 38-41, but now further illustrate the use of opposing indenters acting on a bushing type insert having an upper flange with nut retention elements for installation of a nut.
Figure 43:
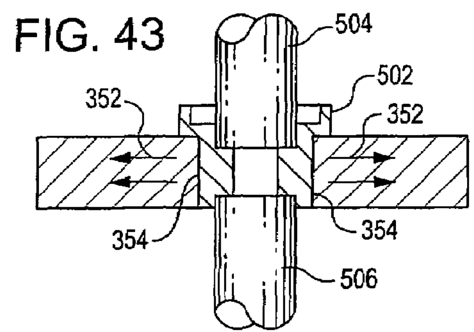

Similar indenter shapes are useful provided in deformation of flanged inserts 440 as illustrated in FIGS. 38-40. Here, first 410 and second 412 indenters are shown with a flat face 414 and 416 for acting on obverse 417 and reverse 418 sides of a flanged, solid insert 440. Here, insert 440 is deformed to the shape illustrated in FIGS. 39 and 40, wherein the opposing indenters 410 and 412 have shaped indentations 442 and 444 (formed by faces 414 and 416) in insert 440. The insert 440 has been deformed radially outward in the direction of reference arrows 352 outwardly to compress the hole edgewall portion 354 of metal structure 200. Finally, to prepare the working hole $H_W$, drill 217 is utilized in the manner shown elsewhere to prepare the final, finished annular bushing insert 450 having annular walls 452 with a interior wall portion 454 in metal structure 200 as indicated in FIG. 37.

Figure 78:
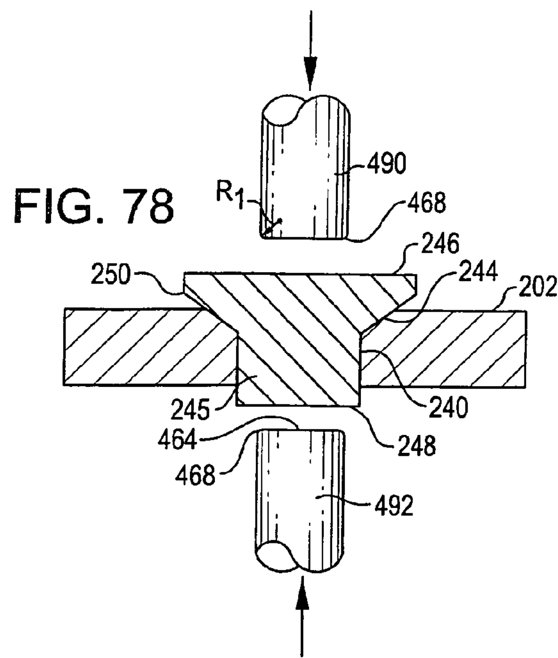
FIGS. 78-80 illustrate the installation of a solid plug with a countersink head portion in an complementary metal structure having on one side an inwardly sloping countersink receiving portion.
Figure 79:
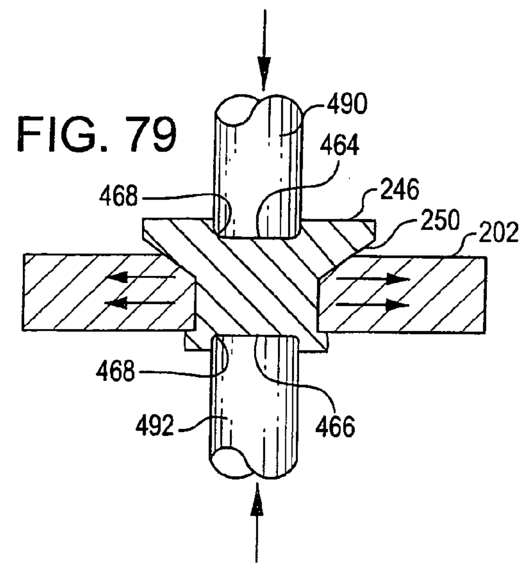
Figure 80:
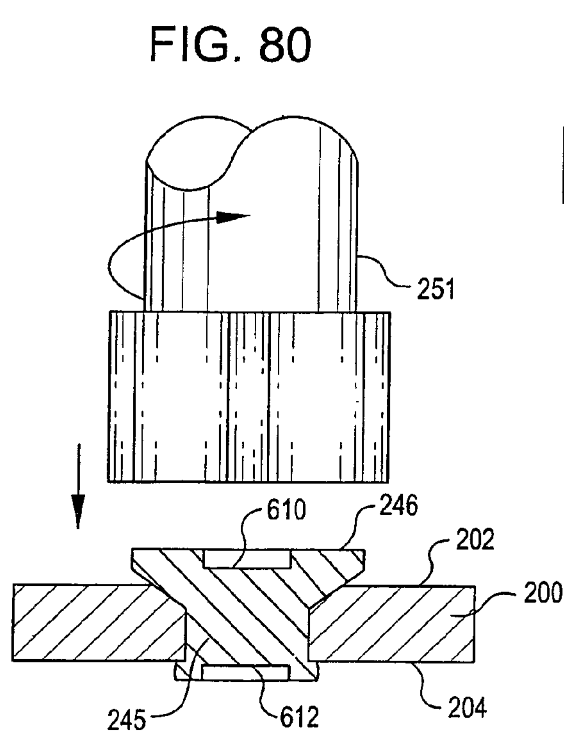

Another useful indenter shape is shown in FIGS. 78 and 79, wherein indenters 460 and 462 having flat bottoms 464 and 466 utilizes radiused edges 468, shown as radius $R_1$ in FIG. 78.

Figure 45:
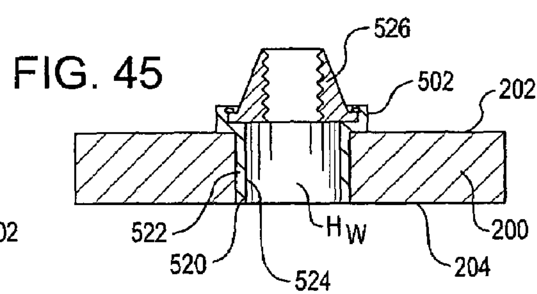
Figure 44:
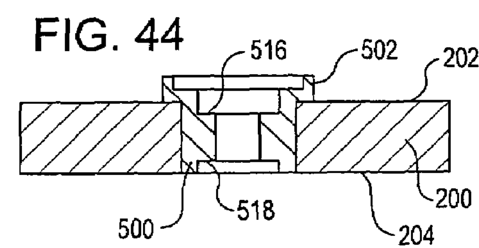
Figure 46:
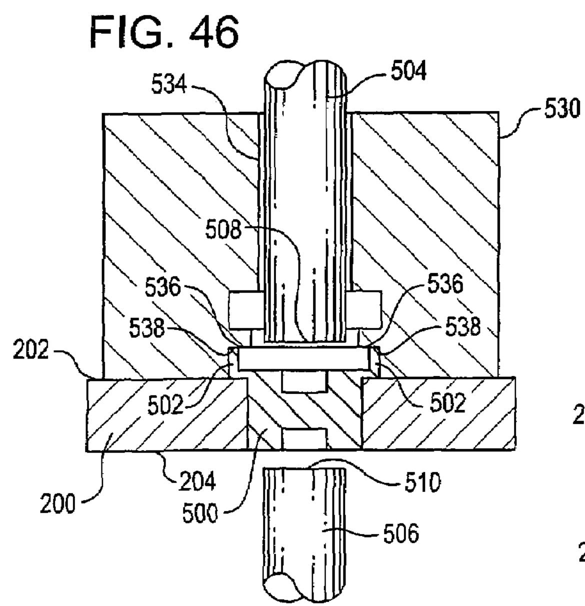
FIG. 46 shows an installation tool that, in this figure, positions the nut plate and nut retention element, and aligns at least one of the indenters for acting on an H-shaped insert.
Figure 47:
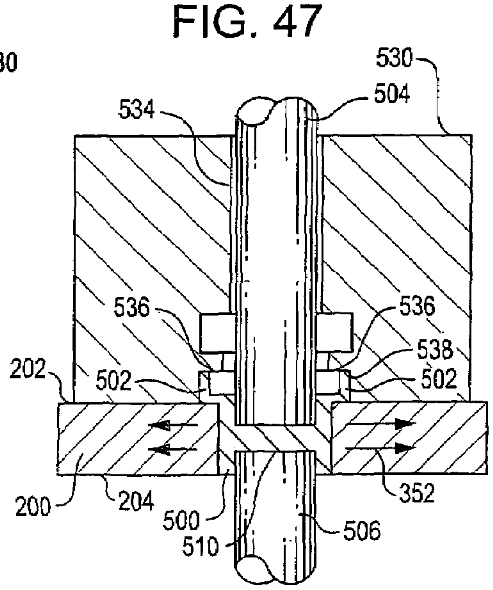
FIG. 47 shows the use of the installation tool first described in FIG. 46, now showing the tool preventing flange lift-off during the installation of the nut plate and nut retention element.

Flanged bushings 500 including nutplate retaining elements 502 can be similarly formed, as shown by deformation of flanged bushing inserts 500 illustrated in FIGS. 42-45. Here, first 504 and second 506 indenters are shown with a flat face 508 and 510 for acting on obverse 512 and reverse 514 sides of a flanged, solid insert 500 with nutplate retaining elements 502. Here, insert 500 is deformed to the shape illustrated in FIGS. 43 and 44, wherein the opposing indenters 504 and 506 have shaped indentations 516 and 518 (formed by faces 508 and 510) in insert 500. The insert 500 has been deformed radially outward in the direction of reference arrows 352 outwardly to compress the hole edgewall portion 354 of metal structure 200. Finally, to prepare the working hole $H_W$, drill 217 is utilized in the manner shown elsewhere to prepare the final, finished annular bushing insert 520 having annular walls 522 with a interior wall portion 524 in metal structure 200 as indicated in FIG. 45. Also shown in FIG. 45 is a floating nut 526 in working location in place in nutplate retaining element 502.

Figure 48:
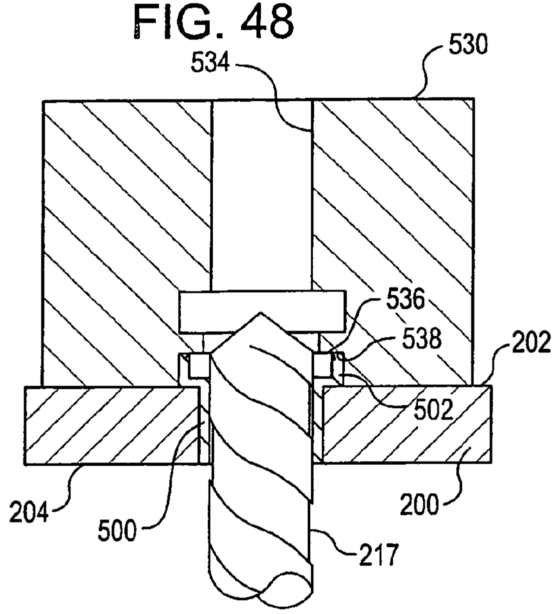
FIG. 48 shows the use of the installation tool to prevent rotation and pushout of the nut plate during the hole drilling process.
Figure 49:
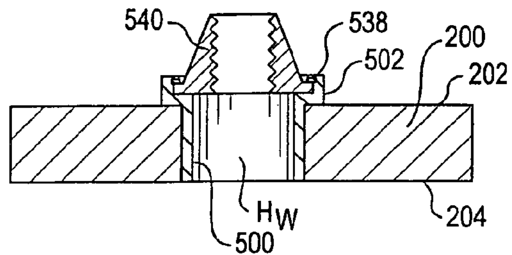
FIG. 49 illustrates an installed nut plate, as provided by the method shown in FIGS. 46-48 above, and then adding a nut to the nut retention element.
Figure 50:
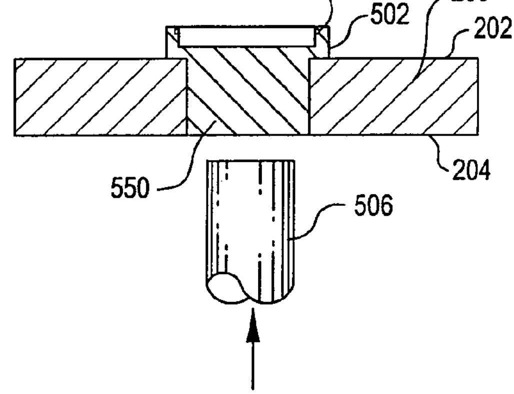
FIGS. 50-53 illustrate a method similar to the method provided in FIGS. 42-45, but now showing the use of a solid plug, flush mounted at the bottom and having an external flange and nut retention element.
Figure 51:
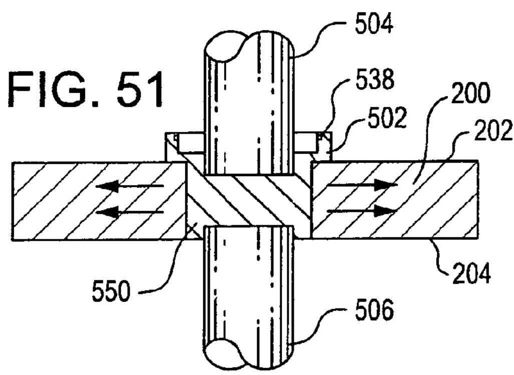
Figure 52:
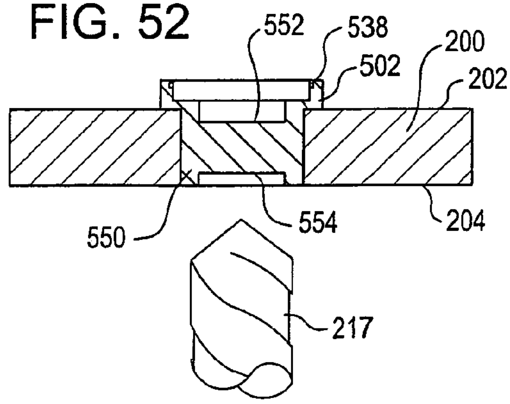

A further enhancement of the method just shown in FIGS. 42 to 45 additionally includes the use of a flange retention tool 530 that secures the flange 532 adjacent said first surface 202 of the metal structure 200 during the step of subjecting the insert 500 to physical deforming forces, so that the flange 532 is maintained in a position in contacting engagement with the first surface 202 of the metal structure 200. Even when using the flange retention tool 530, the step of subjecting the insert 500 to physical deforming forces is carried out in a single indenting step using at least one indenter. Although various configurations are feasible for such flange retention tools, the one shown here includes a central axial passageway 534 through which first indenter freely passes, and a flange engaging annular ledge 536 (appears as two ledges in cross-sectional view) having a lower side portion that is in firm restraining engagement with an upper end portion 538 of nut retention element 502. A foot portion 540 of retention tool 530 engages against first surface 202 of metal structure 200, in order to further prevent surface upset during the indenting step. And, as further indicated in FIG. 48, the retention tool 530 is also useful to retain the insert 500 during the step of forming a finished hole by drilling out excess material from the interior of insert 500. Thus, in this way, during formation of the working hole $H_W$, a backing support via way of retention tool 530 is placed against an insert so that axial movement of the insert is resisted during formation of the working hole. The finished working hole $H_W$ is shown in FIG. 49, where the nut retention element 538 is shown configured to secure nut 540. Also, note that in the embodiment of this method shown in FIGS. 46-49, a generally H-shaped insert 500 was provided for starting the nutplate installation process.

Figure 53:
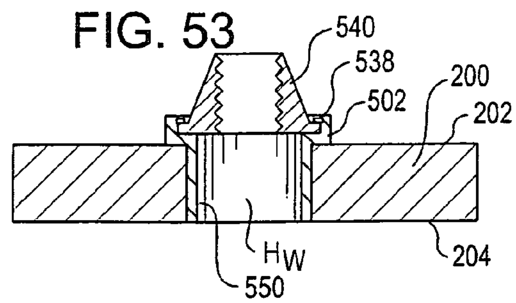

Turning now to FIGS. 50 through 53, a similar operation is provided, but now starting with a solid flanged insert 550 having a nut retention element 538. Indenters 504 and 506 act on insert 550, in the manner described above, to create residual residual stress in the manner herein above described, leaving behind indentations 552 and 554. The working hole $H_W$ is formed via drilling out the indentations 552 and 554 with drill 217. As shown in FIG. 53, a finished flanged bushing 550' having a nut retention element 538 thereon is provided holding nut 540.

A similar apparatus and method is utilized for beveled or sloping metal surfaces such as surface 200' as indicated in FIGS. 67 through 70. Here, indenters 504 and 506 act as previously described to form indentations 552 and 554. The bushing 550 sticks down below the lower sloping surface 560 at the start of the nut installation process. After using drill 217 to create the working hole $H_W$, a milling device 251 is used to machine away the excess portion 562 of bushing 550, so that a new, sloping lower end 564 is provided for bushing 560 that matches the profile of sloping surface 560.

Again referring to FIGS. 71 and 72, a flanged bushing 580 with nut retention element 538 is shown installed in a curved metal structure 200". A milling operation is provided with tool 251 to remove the overflush end 582 of bushing 580, to provide a finished, installed flanged bushing 580' on in the curved metal structure 200" in a manner that the machined lower end 582' of bushing 580 is flush with lower surface 584 of structure 200".

Figure 41:
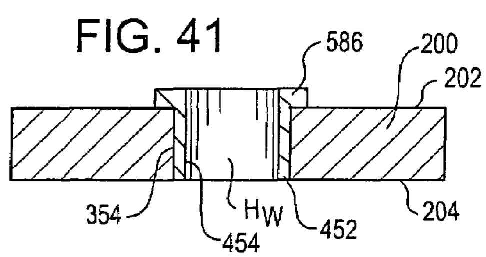
Figure 73:
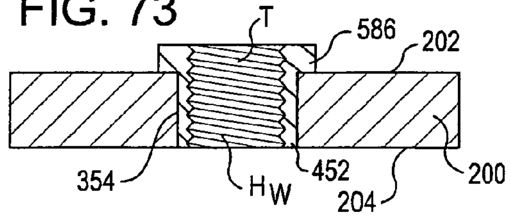
FIG. 73 illustrates the installation of a threads in the interior of a bushing as provided in FIG. 41 above.
Figure 74:
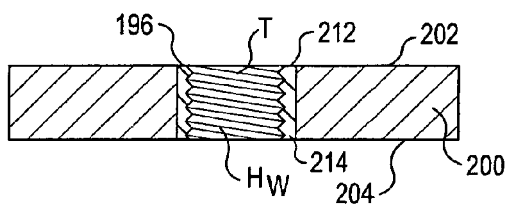
FIG. 74 illustrates the further installation of threads in the interior of a bushing first installed in a manner such as illustrated in FIG. 37 above.
Figure 75:
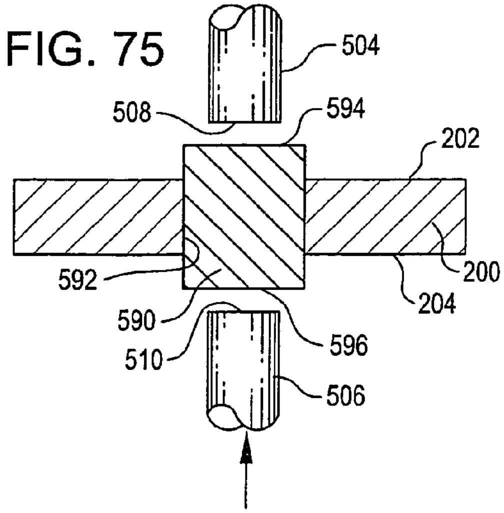
FIG. 75 shows the use of opposing indenters to deform a double overflush solid plug which has been inserted in a reselected hole.

Attention is now directed to FIGS. 73 and 74. In FIG. 73, the structure first shown in FIG. 41, with upper flange 586, is now shown including the further step of installing a threads T in the working hole $H_W$. In FIG. 74, the structure first shown in FIG. 4 that has an annular bushing installed flush with surfaces 202 and 204 in structure 200, now is shown including the further step of installing threads T in the working hole $H_W$.

Further attention is directed to FIGS. 75-78, wherein a double overflush solid plug insert 590 with sidewalls 592 and first end 594 and second end 596 is shown ready for deformation in a selected starting hole 598 in metal structure 200 comprised of one or more layers $\mathbf{200}_1$, $\mathbf{200}_2$, etc., in a series from $\mathbf{200}_1$ to $\mathbf{200}_x$, where x is equal to the number of layers. Deformation via indenters 504 and 506 results in formation of indentations 600 and 602 in the insert 590. By use of mill 251 or other suitable means, the excess material on the first end 594 is removed to form a new first end 594' that is flush with the upper surface 202 of structure 200. Plugs such as plug 590 are commonly used to repair damaged or discrepant holes in structural walls. In service damage to a hole is usually in the form of fatigue cracks, galling, fretting, corrosion, distortion, foreign object damage, or any other factor requiring the hole to be repaired. Discrepancies to the hole may occur in new production, repair and inspection of the hole as a result of improper machining. A discrepant hole may be oversized, misaligned, improperly located, improperly shaped, have bad surface finish, or any other factor that makes it unacceptable for continued use without repair. Thus, the use of repair plugs such as plug insert 590 as disclosed herein would be advantageous in many applications.

Figure 76:
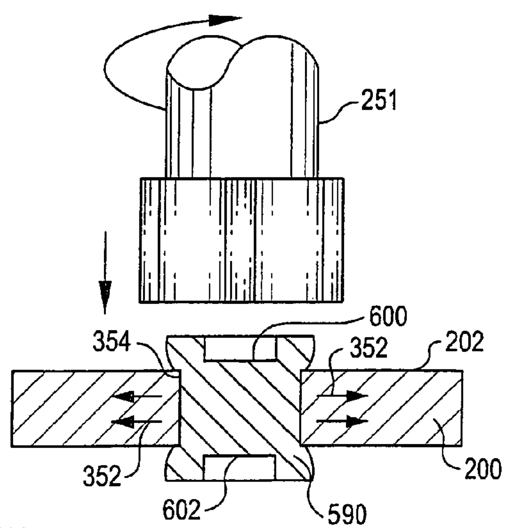
FIG. 76 illustrates the step of milling off of one of the overflush portions resulting from deformation of the solid plug as just shown in FIG. 75.
Figure 77:
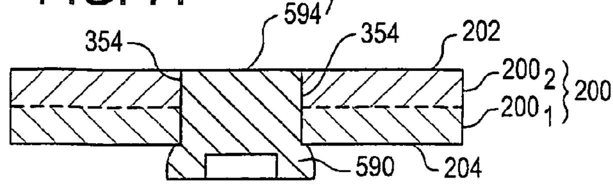
FIG. 77 illustrates the finished plug resulting from milling of one side of the solid plug as set forth in FIG. 76 above.
Figure 82:
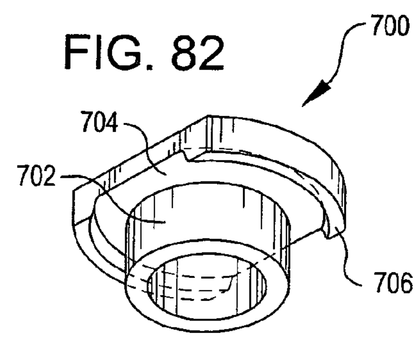
FIG. 82 provides a bottom perspective view of one advantageous hollow plug with flanged nutplate retaining element, and further showing partial downwardly extending anti-rotating elements suited for press fitting engagement with the upper surface of a selected metal structure.

In a similar fashion to the milling operation just described with respect to FIG. 76, in FIGS. 81 and 82, residual indentations 610 and 612 remain in flanged insert 245 after indentation via indenters 490 and 492. The upper portion 246 is milled via mil 251 to remove excess material, to provide a new upper portion 246' that is flush with upper surface 202 of structure 200, as seen in FIG. 81. Unless required by a particular application, the lower indentation 612 is allowed to remain in a plug application, which is normally advantageous since a small locking shoulder 616, usually in the form of an annular ring, is often provided in a manner that overlaps and is in contact with lower surface 204, to assist in securing the plug 245 in metal structure 200.

Attention is now directed to FIGS. 82-87. FIG. 82 provides a bottom perspective view of a nutplate blank insert 700 with barrel portion 702, flange 704 and anti-rotation feature 706 for installation on a metal structure 200 for affixing a nutplate thereto. The anti-rotation feature is configured press fitting engagement with the first surface 202 of the metal structure 200 upon receipt of deforming forces which act against the insert in the manner further explained in FIGS. 83-87 below. It should also be noted that although a cylindrical barrel design is shown for a nutplate blank, such nutplate blanks can also be provided utilizing a generally H-shaped ring insert (see FIG. 18) or ring-like opposing pentagonal cross-sectional design (see FIG. 22).

Figure 83:
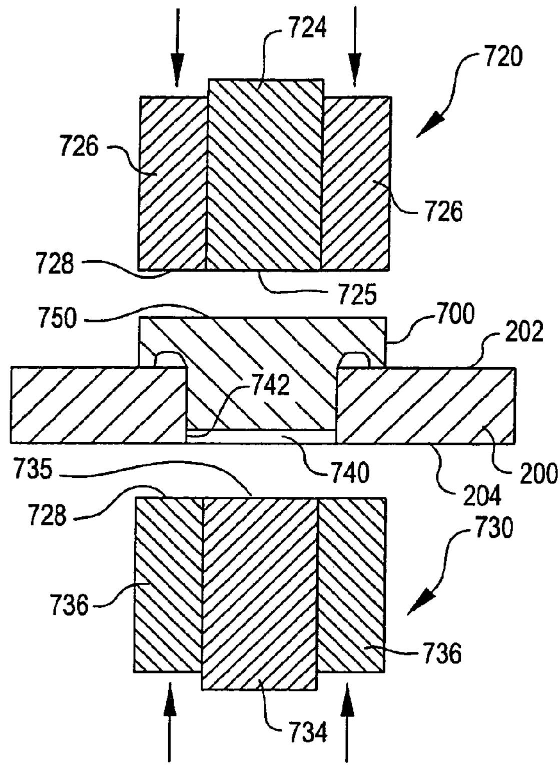
FIG. 83 illustrates the setup step for the use of an indenter having a central cylindrical portion and an annular portion surrounding the cylindrical portion, wherein the annular portion is configured for application of indenting pressure against the flanged portion of the solid plug first illustrated in FIG. 82, in order to install the plug and firmly affix the anti-rotation elements in the metal structure.
Figure 86:
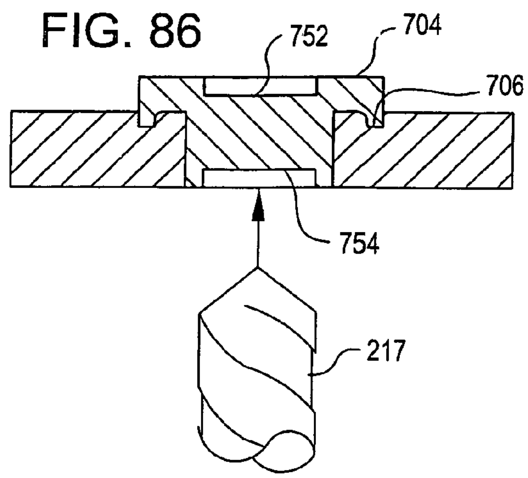
FIG. 86 shows the enlarged indentations in the plug insert, before the step of machining a working hole of desired size in the insert.
Figure 85:
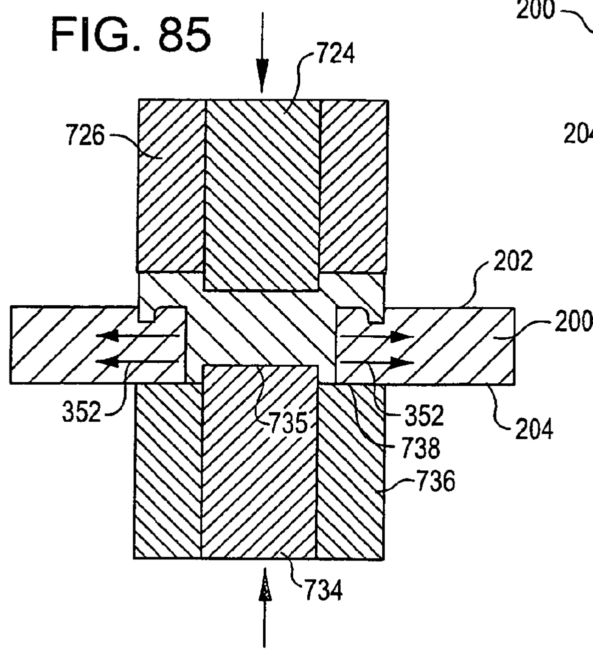
FIG. 85 shows the second indentation step for the apparatus and plug just described in FIG. 83, now showing the relative position of the annular indenter and the central foot portion when the opposing central, cylindrical indenters act to deform the plug.
Figure 84:
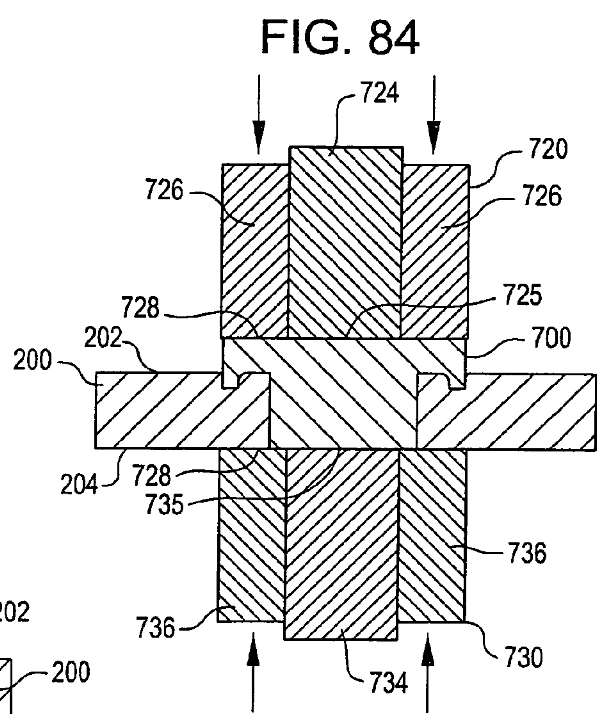
FIG. 84 illustrates the first indentation step for the apparatus and plug just described in FIG. 83, now showing the relative position of the annular indenter and the central foot portion.
Figure 87:
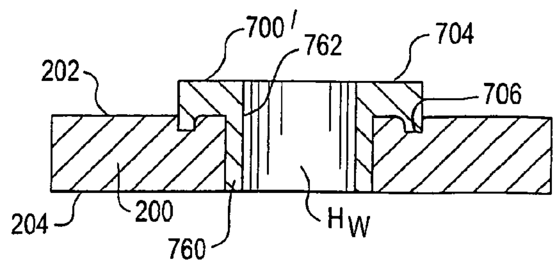
FIG. 87 shows the appearance of a final installed straight wall nut plate in a metal structure, using as an insert a nutplate blank having a solid barrel portion, as prepared via the method just shown in FIGS. 83-86.
Figures 88, 92, 93:
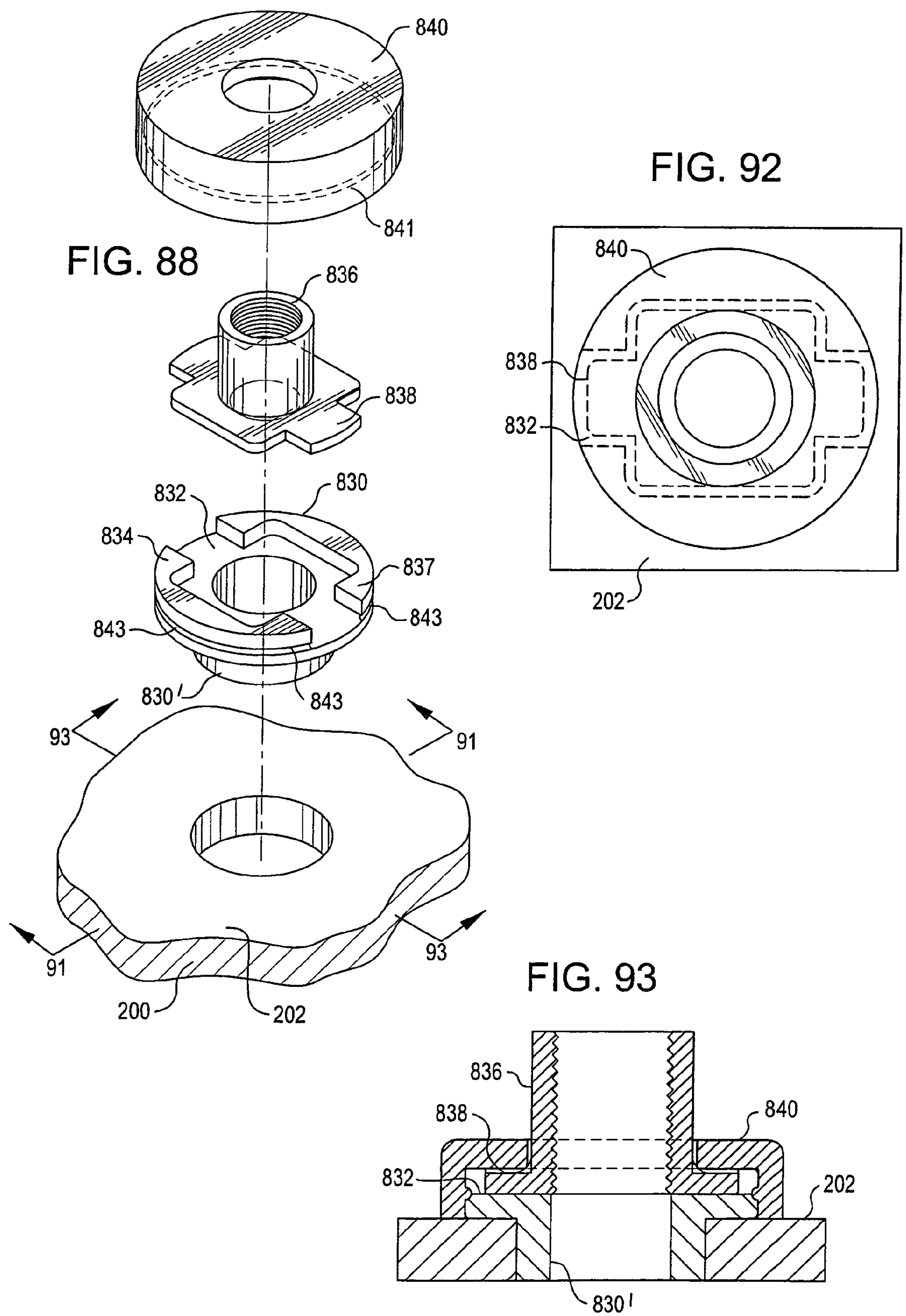
FIGS. 88-93 show the manufacture of one embodiment of a nutplate.
Figure 91:
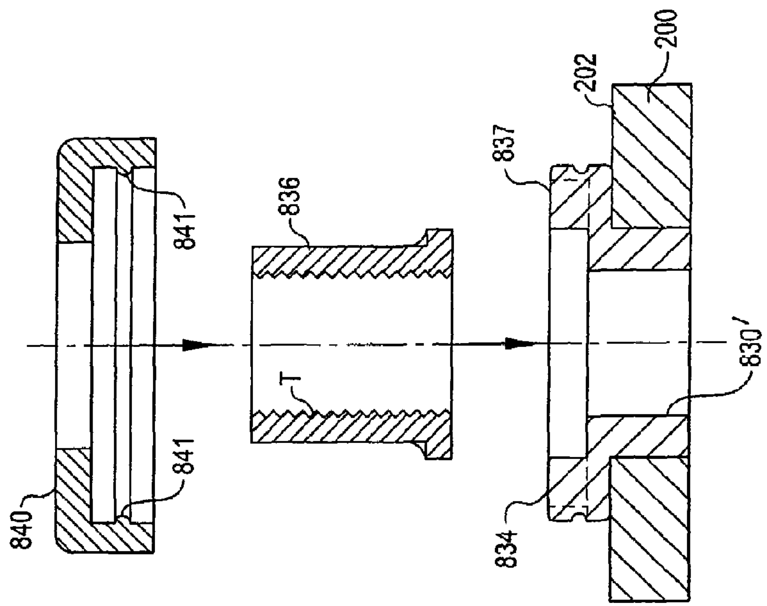
Figure 90:
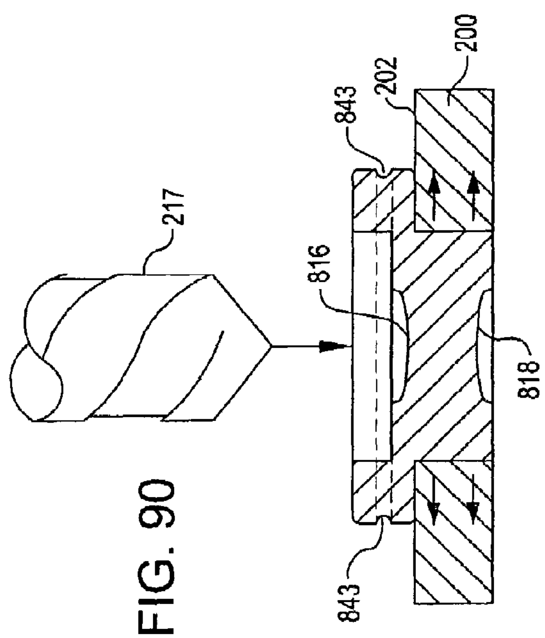
Figure 89:
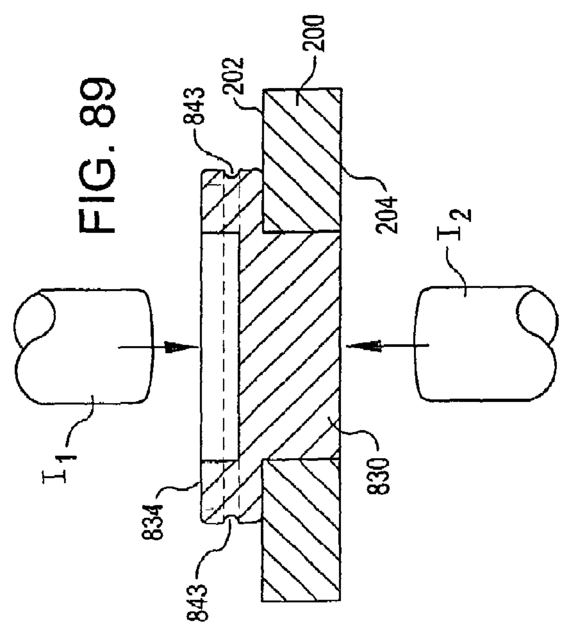
Figure 99:
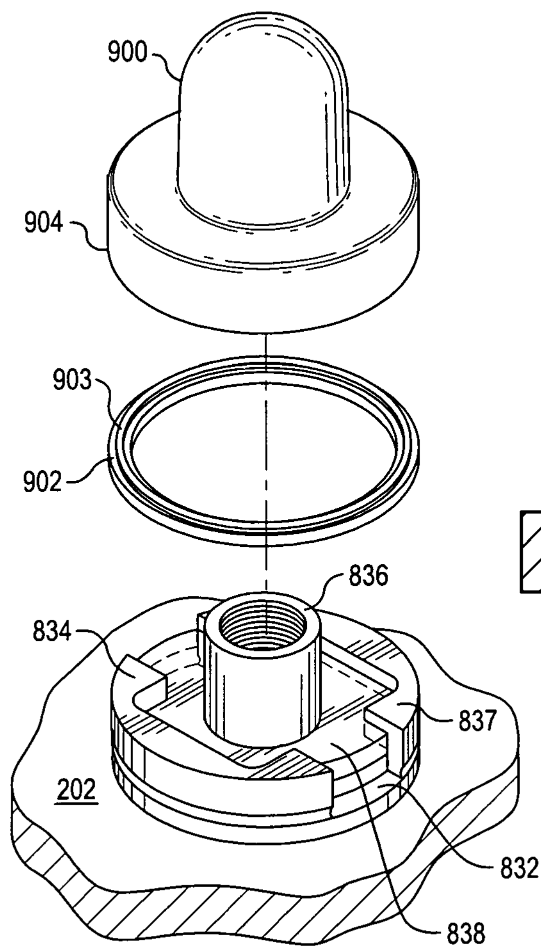
In FIG. 99, yet another embodiment for an advantageous nutplate design is provided; here, a cap, a seal, and a nutplate recess element are provided for sealing installation at a first surface of a metal structure.
Figure 100:
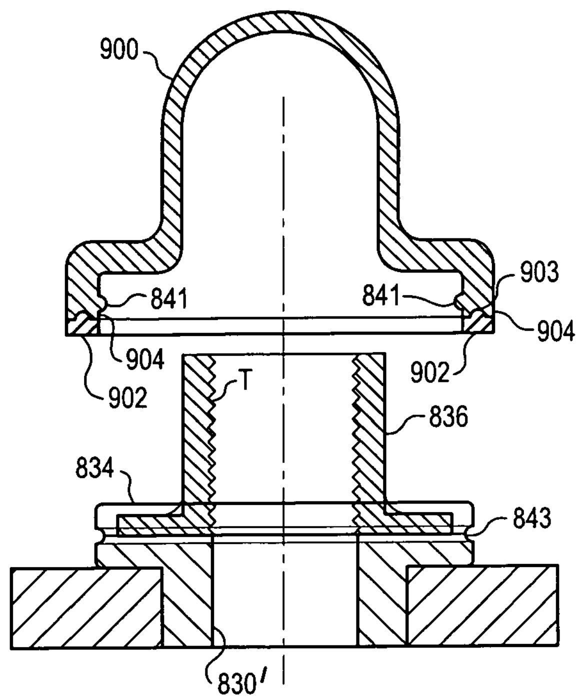
In FIG. 100, the embodiment just provided in FIG. 99 is shown, illustrating (a) the seal below the cap, and (b) the installation of the nut within the nutplate recess element, and (c) installation of the cap on the exterior of the nutplate recess element.
Figure 101:
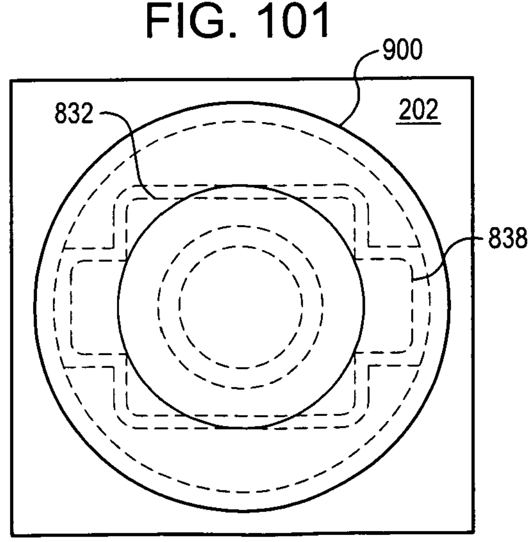
FIG. 101 shows a top plan view of the nutplate first provided in FIGS. 99 and 100, now shown installed on a metal substrate.
Figure 102:
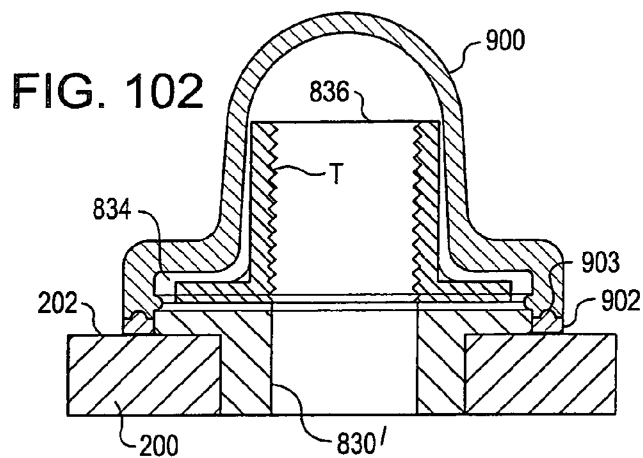
FIG. 102 provides a vertical cross-sectional view of the nutplate first illustrated in FIGS. 99-101, showing the leak tight installation, using a bushing insert final design configuration for close fitting engagement in a selected hole in a metal structure.

FIGS. 83 through 85 show the use of a first compound indenter 720 and a second compound indenter 722 for installation of the nutplate blank insert 700 on a metal structure 200. First compound indenter 720 includes a center indenter portion 724 having an inner contact end 725, and an outer, preferably annular indenter portion 726 having a outer contact end 728. The second compound indenter 730 includes a center indenter portion 734 having an inner contact end 735 and an outer indenter portion 736 having an outer contact end 738. First, the insert 700 is placed into a selected starting hole 740 defined by edgewall portions 742 in structure 200. Then, the second compound indenter is brought flush with second or lower surface 204 of structure 200, to act as an anvil or backing plate. Then, the first compound indenter acts, advantageously if in unison, against upper surface 750 to press fit the anti-rotation features 706 of blank 700 into the upper surface 202 of structure 200. Next, as shown in FIG. 85, both the first and second compound indenters 720 and 730 use their respective outer indenter portions 726 and 736 as a foot or stop against adjacent surface (the top 750 of blank 700 in the case of first indenter 720, and the lower surface 204 in the case of second indenter). The outer foot portions are configured to engage and confine said the second surface of the metal structure 200 when the first indenter acts on the insert. Also, outer the foot portions of the first indenter are configured to engage and confine the upper surface of the insert 700 when the inner or center indenter of the second compound indenter acts on the insert 700. While maintaining the foot portions 726 and 736 in their contact positions, the center indenters are used in opposing fashion to place indentations 752 and 754 in blank 700, to expand the base 702 in the manner described hereinabove. In FIG. 86, the step of removing unneeded material via drill 217 is shown. Finally, the finished, mounted nutplate 700' is shown in place on structure 200, having an annular hole defining portion 760 with inner sidewall 762. And, although a solid or plug body portion has been provided in nutplate blank 700, it should be understood that a bushing type nutplate blank can also be utilized, as well as H or ring-like plug designs as variously described hereinabove.

It should also be noted that for any of the various plugs or bushings described herein, a further step in the method may include the additional step, prior to the step of inserting the insert into the metal substrate, of roughening the peripheral wall of an insert to a preselected roughness, in the manner indicated in FIG. 109 below. Interestingly, such roughening has been shown to increase the fatigue life, in some cases by as much as a factor of two over a bushing-like member of similar configuration that has not been similarly roughened. The roughened surface of the plug and bushing like member decreases the amount of slip, under load, between its exterior surface and the surface of the hole in which it is installed. Reducing the slip between the two surfaces reduces the amount of fretting. Fretting is defined as the relative oscillatory motion between two touching surfaces where such motion causes damage to one or both of the surfaces. Fretting is a know factor in the initiation of cracks. By minimizing the fretting, and thus minimizing subsequent cracking, the overall fatigue life of a structure is enhanced when a roughened peripheral surface of the plug or bushing is provided. The step of roughening the peripheral wall of an insert may be accomplished by blasting the peripheral wall with air entrained media, such as sand, garnet, or other suitable materials. Alternately, the step of roughening the peripheral wall of the insert may be accomplished by tumbling the insert in roughening media. In one embodiment, the roughness of the peripheral wall is desirably from about 125 micro-inches to about 250 micro-inches. In other materials and applications, the roughness of the peripheral wall is at least 250 micro-inches. In FIG. 109, the bushing 790 has a roughness in peripheral wall 800 that is indicated by the many miniature indentation representations 802. Additionally, as indicated in FIG. 110, it is sometimes also desirable to include a further step, prior to the step of inserting the insert such as insert 790 into said metal substrate, of providing a micro-encapsulated glue 804 on the peripheral wall 800 of the insert 790.

In yet another embodiment, shown in FIGS. 111 and 112, the outer peripheral wall 810 of bushing 812 includes a plurality of micro-fluting knurled, such as between 30 and 120 fluting pairs (ridge 814 and valley 816) per inch. Ideally, such pairs include radiused corners 818 between ridges 814 and valleys 816.

Referring now to FIGS. 88-93, a nut plate with novel nut retaining element attachment method is shown. The nut plate 830 is first installed in structure 200 using the method of deformation with opposing indenters described earlier (the method is also repeated in FIGS. 89 through 91 wherein uniform pressure profile type first and second indenters I1 and I2 are shown, to create indentations 816 and 818, which are subsequently drilled out to provide a hollow nutplate bushing 830'). The nut plate 830 has a recess 832 in the upper portion 834 of its outwardly extending flange 838 that can be selected to match a desired nut element 836 footprints as defined by tabs 838. It should be noted that a "nut element" 836 is a term that describes any threaded component that retains a fastener. Matching the dimensions of the nut footprint 838 perimeter with the recess 832 usually is configured to allow for the nut element 836 to float by at least about 0.020 inches radially in any direction. Such float facilitates fastener installation. When ready for installation, the nut element 836 is then placed into the nut plate flange recess 832. In this configuration, a retaining cap 840 is then snapped over the vertical exterior 842 of the nut plate flange 837 to secure the nut element 836. The retaining cap 840 includes features such as inter-engaging ridges 841, to fit with grooves 843 in vertical flange 842, to provide for a secure fit precluding plush out of the nut element 836 during fastener installation. In this case, the use of a matching half-cylinder notch ring in the nutplate, and matching protrusion in the interior of the retaining cap 840 is provided.

In FIGS. 97 and 98, another embodiment is shown in which the cap 840' utilizes a catchment lip 860 which acts against a catchment ledge lip 843' in nutplate 840'. In this embodiment, the retaining cap 840' is forced onto the nut plate 830' flange, snapping it into place over the catchment ledge lip 843'. This provision of a series of "one-way" sheared features provide for easy installation. The angle of the sheared elements make it easy for the retaining ring to slip over the nut plate flange, but make it difficult to remove, giving it a high resistance to push out forces from fastener installation.

In FIGS. 99 through 102, the steps of installing a nut plate with novel element attaching methods for a sealed installation are provided. The dome 900 feature of the retaining device prevents fluid from penetrating the wall surface 202 to which the nut plate is secured. The nut plate base is first installed using the method of pressing with opposing indenters, as described above, to provide an installed nutplate base 830'. The nutplate has a recess 832 in its upper flange that can be provided to match standard nut element footprints; here a nutplate is shown located in the flange. The dimensions of the matching perimeter of the recess allow for the nut element to float by at least 0.020 inches radially in any direction. The float facilitates fastener installation. After drilling the fastener hole, the nut element is then placed into the nut plate flange recess 832. The domed retaining device 900 is then snapped over the exterior of the nut plate flange to secure the nut element 836. The domed retaining device 900 has features along the sides that provide for a secure fit precluding push out of the nut element during fastener installation, such as the groove/ridge design just discussed above. The dome 900 also has an integral seal ring 902 that runs around the periphery 904 of the base of the domed element 900. Ring 902 may include grooved and/or ridged 903 elements necessary to form a secure seal. When the dome retaining device 900 is snapped onto the nutplate base 830', the resilient seal ring 902 is squeezed down an appropriate amount for substantially preventing fluids from penetrating into the internal cavity, or through the structure wall 202.

Now, in FIGS. 104-106, yet another nut plate design is illustrated, here utilizing an internal snap ring 920 as the means to retain the nut element 836. The nutplate 830 is first installed using the methods of pressing a plug or bushing element with opposing indenters as described earlier above. The nut plate 830 has a recess 832 in its flange 834 that can be configured to match standard nut element footprints. The dimensions of the matching perimeter of the recess allow for the nut element 836 to float by at least 0.020 inches radially in any direction. The float facilitates fastener installation. After drilling the fastener hole, the nut element 836 is then placed into the nut plate flange recess 832. A snap ring 920 is then snapped into an interior groove 922 in the interior of the nut plate flange 834 to secure the nut element 836. Further details of the use of this snap-ring for securing a nut on a nutplate are illustrated in FIGS. 104, 105, and 106. In particular, note the location of the snap ring as shown in FIG. 106.

Finally, in FIGS. 107 and 108, an o-ring seal 940 can be utilized to provide a separately mounted flange 942 for attachment on a plug 944. A countersink head 946 can be used at the bottom at surface 204. A locking pattern 948 can be used in the flange head 950 for securing the flange in place during installation.

It is to be appreciated that the various aspects and embodiments of the method and apparatus for installing a blind nut attachment, and the nut plate structure as described herein are important improvements in the state of the art of structures and materials for securing blind nut attachments to structures. Although only a few exemplary embodiments have been described in detail, various details are sufficiently set forth in the figures of the drawing and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided as described herein, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s) is as described herein and as set forth in the appended claims, and as indicated by the drawing and by the foregoing description, is intended to include variations from the embodiments provided which are nevertheless described by the broad interpretation and range properly afforded to the plain meaning of the language therein, and as also stated in the provisional claims set forth below.

The invention claimed is:

1. A method of attaching a nut element to a metal structure, said structure having obverse and reverse surfaces, said method comprising:

(a) providing a selected hole of suitable size and shape through said metal structure from said obverse surface to said reverse surface, by (i) inspection and acceptance of sidewall portions of a pre-existing hole, to provide a selected hole, or (ii) enlargement or rework of a pre-existing hole to provide at least some new sidewall portions, to provide a selected hole, or (iii) if no hole exists, providing a new hole with new sidewall portions through said metal structure, to provide a selected hole;

(b) providing a nutplate base having a deformable metal insert comprising a body portion, said deformable metal insert sized and configured for insertion adjacent at least some of said sidewall portions of said selected hole, said body portion having first and second ends and peripheral wall extending for a length between said first and second ends;

(c) inserting said deformable metal insert into said selected hole without deforming said metal structure or said metal insert, so that the body portion extends at least partially into the selected hole and at least a portion of said peripheral wall of said metal insert is adjacent at least a portion of said sidewall of said selected hole;

(d) after insertion, compressing the metal insert with opposing tools having primarily an axial force component to physically deform the metal insert sufficiently that it frictionally engages at least some of the sidewall portions of the selected hole and radially displaces at least some of the body portion of said metal insert, and radially displaces at least some of said metal structure, causing at least some of the sidewall portions of said selected hole to exert compressive forces against said metal insert to enhance fatigue life of the metal structure adjacent the body of said metal insert, and substantially fixing said metal insert within the selected hole;

(e) providing a nut element; and (f) securing said nut element to said nutplate base.

2. The method as set forth in claim 1, further comprising forming a working hole through said metal insert, said working hole extending through said metal insert from said first end to said second end.

3. The method as set forth in claim 2, wherein during formation of said working hole, a backing support is placed against at least some of either the first or second end of said metal insert, whereby axial movement of the metal insert is resisted during formation of the working hole.

4. The method as set forth in claim 2, wherein said metal insert further comprises an external flanged portion, and wherein during formation of said working hole, a backing support is placed against at least some of said external flanged portion, whereby axial movement of the metal insert is resisted during formation of the working hole.

5. The method as set forth in claim 2, wherein the step of deforming the metal insert results in one or more indentations in said metal insert, and wherein the step of creating a working hole in said metal insert removes said indentations.

6. The method as set forth in claim 2, further comprising installing threads in said working hole.

7. The method as set forth in claim 1, wherein said metal insert is cylindrical.

8. The method as set forth in claim 7, wherein said sidewall portions comprise, adjacent either said first or said second surface of said metal structure, a countersink shoulder.

9. The method as set forth in claim 8, wherein said metal insert further comprises, either at said first or at said second end, a countersink head portion.

10. The method as set forth in claim 9, wherein said head portion of said metal insert comprises a frustoconical configuration and wherein the body portion of the metal insert comprises a cylindrical configuration.

11. The method as set forth in claim 9, wherein said countersink head portion is installed in an overflush configuration.

12. The method as set forth in claim 1, wherein said metal insert has a non-cylindrical configuration.

13. The method as set forth in claim 12, wherein said metal insert has an eccentric configuration.

14. The method as set forth in claim 13, wherein said metal insert has an elliptical configuration.

15. The method as set forth in claim 1, wherein said working hole in said metal insert has a cylindrical configuration.

16. The method as set forth in claim 1, wherein after insertion of said metal insert, the metal insert is positioned in a flush configuration with respect to said first and said second surfaces of said metal structure.

17. The method as set forth in claim 1, wherein after insertion, said metal insert is positioned in an underflush configuration with respect to said first or said second surfaces of said metal structure.

18. The method as set forth in claim 1, wherein after insertion, said metal insert is positioned in an overflush configuration with respect to said first or said second surfaces of said metal structure.

19. The method as set forth in claim 1, wherein after insertion, said metal insert is positioned in a double overflush configuration with respect to said first and said second surfaces of said metal structure.

20. The method as set forth in claim 18 or in claim 19, further comprising after physically deforming the metal insert, the step of removing at least some of an overflush portion of said metal insert.

21. The method as set forth in claim 20, wherein, after removing at least some of an overflush portion of said metal insert, either said first or said second end of said metal insert is flush with either the first surface or second surface of said metal structure.

22. The method as set forth in claim 1, wherein said metal insert further comprises an external head portion, said external head portion comprising a flange portion extending outwardly from said selected hole.

23. The method as set forth in claim 22, further comprising providing a flange retention tool to secure said flange adjacent said first surface of said metal structure when subjecting the metal insert to physical deforming forces, so that said flange is maintained in a position in contacting engagement with said first surface of said metal structure.

24. The method as set forth in claim 1, or in claim 23, wherein deforming the metal insert is carried out in a single indention action.

25. The method as set forth in claim 22, wherein said flange portion further comprises an anti-rotation feature, and wherein said anti-rotation feature is configured for press fitting engagement with said first surface of said metal structure upon receipt of deforming forces against said metal insert.

26. The method as set forth in claim 25, wherein said anti-rotation feature comprises at least a portion of a downwardly projecting ring.

27. The method as set forth in claim 1, wherein said selected hole has formed therein at least one non-circular feature that extends axially from said first surface to said second surface of said selected hole.

28. The method as set forth in claim 27, wherein said body portion of said metal insert includes, prior to deformation thereof, a feature complimentary to said at least one non-circular feature in said selected hole.

29. The method as set forth in claim 1, or in claim 27, wherein physically deforming the metal insert comprises using a first indenter acting on said first end of said metal insert.

30. The method as set forth in claim 29, wherein subjecting the metal insert to physical deforming forces includes the use of a second indenter acting on said second end of said metal insert.

31. The method as set forth in claim 30, wherein said second indenter has a non-round cross-section.

32. The method as set forth in claim 30, wherein said second indenter further comprises a foot portion, said foot portion configured to engage and confine said second surface of said metal structure when said second indenter acts on said metal insert.

33. The method as set forth in claim 32, wherein said tubular body portion comprises an interior sidewall, and wherein said method further comprises installing threads in said interior sidewall of said tubular body portion.

34. The method as set forth in claim 29, wherein said first indenter has a non-round cross-section.

35. The method as set forth in claim 29, wherein said first indenter comprises a working end having a flat bottom.

36. The method as set forth in claim 29, wherein said first indenter comprises a working end having (a) a flat bottom portion, and (b) extending outward from said flat bottom portion, chamfered sidewall portions.

37. The method as set forth in claim 29, wherein said first indenter comprises a working end having (a) a flat bottom portion, and (b) extending outward from said flat bottom portion, radiused sidewall portions.

38. The method as set forth in claim 29, wherein said first indenter comprises a working end having a profile which results in uniform pressure application to all or to a portion of said first end of said metal insert.

39. The method as set forth in claim 29, wherein said first indenter comprises a working end having, at least in part, a spherical profile.

40. The method as set forth in claim 29, wherein said first indenter comprises a working end having, at least in part, a conical profile.

41. The method as set forth in claim 29, wherein said first indenter comprises a working end having a pilot nose portion.

42. The method as set forth in claim 29, wherein said first indenter further comprises a foot portion, said foot portion configured to engage and confine said first surface of said metal structure when said first indenter acts on said metal insert.

43. The method as set forth in claim 1, wherein said metal structure comprises a flat structure having uniform cross-sectional dimension adjacent said selected hole.

44. The method as set forth in claim 1, wherein said metal structure has non-uniform cross-sectional dimension adjacent said selected hole.

45. The method as set forth in claim 44, wherein adjacent said selected hole, said metal structure is beveled.

46. The method as set forth in claim 44, wherein adjacent said selected hole, said metal structure is curved.

47. The method as set forth in claim 1, wherein said body portion of said metal insert is tubular.

48. The method as set forth in claim 1, wherein said body portion of said metal insert is solid.

49. The method as set forth in claim 1, further comprising roughening said peripheral wall of said metal insert to a preselected roughness prior to inserting said metal insert into said metal substrate.

50. The method as set forth in claim 49, wherein roughening said peripheral wall of said metal insert comprises blasting said peripheral wall with air entrained media.

51. The method as set forth in claim 49, wherein roughening said peripheral wall of said metal insert comprises tumbling said metal insert in roughening media.

52. The method as set forth in claim 49, wherein the preselected roughness of said peripheral wall is from about 125 micro-inches to about 250 micro-inches.

53. The method as set forth in claim 49, wherein the preselected roughness of said peripheral wall is at least 250 micro-inches.

54. The method as set forth in claim 1, further comprising, prior to inserting said metal insert into said metal structure, providing a micro-encapsulated glue on said peripheral wall of said metal insert.

55. The method as set forth in claim 1, further comprising (a) providing a cage, said cage adapted for adjustably securing said nut element relative to said nutplate base; and (b) securing said nut element to said nutplate base by securely affixing said cage to said nutplate base.

56. A method of attaching a fastener to a metal structure, said structure having obverse and reverse surfaces, and wherein a selected hole is provided for attachment of said fastener, said selected hole defined by sidewall portions extending through said metal structure from said obverse surface to said reverse surface, said method comprising:

(a) providing a selected hole of suitable size and shape through said metal structure from said obverse surface to said reverse surface, by (i) inspection and acceptance of sidewall portions of a pre-existing hole, to provide a selected hole, or (ii) enlargement or rework of a pre-existing hole to provide at least some new sidewall portions, to provide a selected hole, or (iii) if no hole exists, providing a new hole with new sidewall portions through said metal structure, to provide a selected hole;

(b) providing a nutplate base having a physically deformable metal insert comprising a body portion, said physically deformable metal insert sized and configured for insertion adjacent at least some of said sidewall portions of said selected hole, said body portion having first and second ends and peripheral wall extending for a length between said first and second ends;

(c) inserting said deformable metal insert into said selected hole so that the body portion extends at least partially within the selected hole and along at least a portion of said peripheral wall of said metal insert and is adjacent at least a portion of said sidewall of said selected hole;

(d) after insertion, compressing the metal insert with opposing tools having primarily an axial force component to physically deform the metal insert sufficiently that it frictionally engages at least some of the sidewall portions of the selected hole and radially displaces least some of the body portion of said metal insert, and radially displaces at least some of said metal structure, causing at least some of the sidewall portions of said selected hole to exert compressive forces against said metal insert to enhance fatigue life of the metal structure adjacent the body of said metal insert, and substantially fixing said metal insert within the selected hole;

(e) forming a working hole axially through said metal insert, said working hole extending through said metal insert from said first end to said second end of said metal insert.

(f) providing a nut element;

(g) providing a cage, said cage adapted for adjustably securing said nut element relative to said nutplate base; and (h) securing said nut element to said nutplate base by securely affixing said cage to said nutplate base.

57. A method of attaching a fastener to a metal structure, said structure having obverse and reverse surfaces, and wherein a selected hole is provided for attachment of said fastener, said selected hole defined by sidewall portions extending through said metal structure from said obverse portions surface to said reverse surface, said method comprising:

(a) providing a selected hole of suitable size and shape through said metal structure from said obverse surface to said reverse surface, by (i) inspection and acceptance of sidewall portions of a pre-existing hole, to provide a selected hole, or (ii) enlargement or rework of a pre-existing hole to provide at least some new sidewall portions, to provide a selected hole, or (iii) if no hole exists, providing a new hole with new sidewall portions through said metal structure, to provide a selected hole;

(b) providing a nutplate base having a physically deformable metal insert comprising a body portion, said physically deformable metal insert sized and configured for insertion adjacent at least some of said sidewall portions of said selected hole, said body portion having first and second ends and peripheral wall extending for a length between said first and second ends;

(c) inserting said deformable metal insert into said selected hole so that the body portion extends at least partially within the selected hole and along at least a portion of said peripheral wall of said metal insert and is adjacent at least a portion of said sidewall of said selected hole;

(d) after insertion, compressing the metal insert with opposing tools having primarily an axial force component to physically deform the metal insert sufficiently that it frictionally engages at least some of the sidewall portions of the selected hole and radially displaces least some of the body portion of said metal insert, and radially displaces at least some of said metal structure, causing at least some of the sidewall portions of said selected hole to exert compressive forces against said metal insert to enhance fatigue life of the metal structure adjacent the body of said metal insert, and substantially fixing said metal insert within the selected hole;

(e) forming a working hole axially through said metal insert, said working hole extending through said metal insert from said first end to said second end of said metal insert, and forming a tubular body portion having interior sidewalls in said metal insert;

(f) installing threads in said interior sidewall of said tubular body portion;

(g) providing a nut element;

(h) providing a cage, said cage adapted for adjustably securing said nut element relative to said nutplate base; and (i) securing said nut element to said nutplate base by securely affixing said cage to said nutplate base.

58. A method of attaching a fastener to a metal structure, said structure having obverse and reverse surfaces, and wherein a selected hole is provided for attachment of said fastener, said selected hole defined by sidewall portions extending through said metal structure from said obverse surface to said reverse surface, said method comprising:

(a) providing a selected hole of suitable size and shape through said metal structure from said obverse surface to said reverse surface, by (i) inspection and acceptance of sidewall portions of a pre-existing hole, to provide a selected hole, or (ii) enlargement or rework of a pre-existing hole to provide at least some new sidewall portions, to provide a selected hole, or (iii) if no hole exists, providing a new hole with new sidewall portions through said metal structure, to provide a selected hole;

(b) providing a nutplate base having a physically deformable metal insert comprising a body portion, said physically deformable metal insert sized and configured for insertion adjacent at least some of said sidewall portions of said selected hole, said body portion having first and second ends and peripheral wall extending for a length between said first and second ends;

(c) inserting said deformable metal insert into said selected hole so that the body portion extends at least partially within the selected hole and along at least a portion of said peripheral wall of said metal insert and is adjacent at least a portion of said sidewall of said selected hole;

(d) after insertion, compressing the metal insert with opposing tools having primarily an axial force component to physically deform the metal insert sufficiently that it frictionally engages at least some of the sidewall portions of the selected hole and radially displaces least some of the body portion of said metal insert, and radially displaces at least some of said metal structure, causing at least some of the sidewall portions of said selected hole to exert compressive forces against said metal insert to enhance fatigue life of the metal structure adjacent the body of said metal insert, and substantially fixing said metal insert within the selected hole;

(e) forming a working hole axially through said metal insert, said working hole extending through said metal insert from said first end to said second end of said metal insert, and forming a tubular body portion having interior sidewalls in said metal insert;

(f) installing threads in said interior sidewall of said cylindrical tubular body portion;

(g) providing a nut element;

(h) providing a cage, said cage adapted for adjustably securing said nut element relative to said nutplate base; and (i) securing said nut element to said nutplate base by securely affixing said cage to said nutplate base.

59. A method of attaching a fastener to a metal structure, said structure having obverse and reverse surfaces, and wherein a selected hole is provided for attachment of said fastener, said selected hole defined by sidewall portions extending through a portion of said metal structure located between said obverse surface and said reverse surface, said method comprising:

(a) providing a selected hole of suitable size and shape in said metal structure between said obverse surface and said reverse surface, by (i) inspection and acceptance of sidewall portions of a pre-existing hole, to provide a selected hole, or (ii) enlargement or rework of a pre-existing hole to provide at least some new sidewall portions, to provide a selected hole, or (iii) if no hole exists, providing a new hole with new sidewall portions through a portion of said metal structure, to provide a selected hole;

(b) providing a nutplate base having a physically deformable metal insert comprising a body portion, said physically deformable metal insert sized and configured for insertion adjacent at least some of said sidewall portions of said selected hole, said body portion having first and second ends and peripheral wall extending for a length between said first and second ends;

(c) inserting said deformable metal insert into said selected hole without deforming said metal structure or said metal insert, so that the body portion extends at least partially within the selected hole and along at least a portion of said peripheral wall of said metal insert and is adjacent at least a portion of said sidewall of said selected hole;

(d) after insertion, compressing the metal insert with opposing tools having primarily an axial force component to physically deform the metal insert sufficiently that it frictionally engages at least some of the sidewall portions of the selected hole and radially displaces at least some of the body portion of said metal insert, and radially displaces at least some of said metal structure, causing at least some of the sidewall portions of said selected hole to exert compressive forces against said metal insert to enhance fatigue life of the metal structure adjacent the body of said metal insert, and substantially fixing said metal insert within the selected hole;

(e) providing a nut element; and (f) securing said nut element to said nutplate base.

* * * * *